US012576393B2

(12) United States Patent
Ruddy et al.

(10) Patent No.: US 12,576,393 B2
(45) Date of Patent: Mar. 17, 2026

(54) MATERIALS, METHODS, AND SYSTEMS FOR REACTIVE CAPTURE AND CONVERSION OF CO₂

(71) Applicant: Alliance for Energy Innovation, LLC, Golden, CO (US)

(72) Inventors: Daniel Ruddy, Arvada, CO (US); Anh The To, Golden, CO (US); Martha Arellano-Trevino, Golden, CO (US); William Wilson McNeary, IV, Evergreen, CO (US); Chae Woon Jeong-Potter, Lakewood, CO (US); Alex James Hill, Lakewood, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 18/745,807

(22) Filed: Jun. 17, 2024

(65) Prior Publication Data

US 2025/0161917 A1     May 22, 2025

Related U.S. Application Data

(60) Provisional application No. 63/508,797, filed on Jun. 16, 2023.

(51) Int. Cl.
*B01J 23/04* (2006.01)
*B01D 53/62* (2006.01)
(Continued)

(52) U.S. Cl.
CPC .............. *B01J 23/04* (2013.01); *B01D 53/62* (2013.01); *B01D 53/82* (2013.01); *B01J 20/04* (2013.01);
(Continued)

(58) Field of Classification Search
CPC ............ B01J 23/04; B01J 23/06; B01J 23/80; B01J 20/04; B01J 37/0201; B01J 37/03;
(Continued)

(56) References Cited

U.S. PATENT DOCUMENTS

2024/0115987 A1     4/2024   Jeong-Potter et al.

FOREIGN PATENT DOCUMENTS

WO     2022/256361 A2   12/2022
WO     2023/053067 A1    4/2023

OTHER PUBLICATIONS

Previtali et al., "Low pressure conversion of CO2 to methanol over Cu/Zn/Al catalysts. The effect of Mg, Ca and Sr as basic promoters", Fuel 274 (2020) 117804. (Year: 2020).*
(Continued)

*Primary Examiner* — Anita Nassiri-Motlagh
(74) *Attorney, Agent, or Firm* — Michael A. McIntyre

(57) ABSTRACT

The present disclosure relates to a composition that includes a first oxide that includes zinc, aluminum, and copper; and a metal that includes least one of an alkali metal and/or an alkaline earth metal, where the composition has a first total uptake capacity of $CO_2$ of greater than 218 μmol $CO_2$/g of composition at a first temperature of about 40° C., a second total uptake capacity of $CO_2$ of greater than 76 μmol $CO_2$/g of composition at a second temperature of about 300° C., and the composition is capable of converting $CO_2$ to at least one of CO, methane, or methanol, when exposed to $H_2$ at a third temperature greater than the first temperature.

15 Claims, 27 Drawing Sheets

(51) Int. Cl.

| | | |
|---|---|---|
| *B01D 53/82* | (2006.01) | |
| *B01J 20/04* | (2006.01) | |
| *B01J 23/06* | (2006.01) | |
| *B01J 23/80* | (2006.01) | |
| *B01J 37/02* | (2006.01) | |
| *B01J 37/03* | (2006.01) | |
| *C01B 32/40* | (2017.01) | |

(52) U.S. Cl.
CPC ............... *B01J 23/06* (2013.01); *B01J 23/80* (2013.01); *B01J 37/0201* (2013.01); *B01J 37/03* (2013.01); *C01B 32/40* (2017.08); *B01D 2257/504* (2013.01)

(58) Field of Classification Search
CPC ........ C01B 32/40; B01D 53/62; B01D 53/82; B01D 2257/504
USPC ...................................................... 423/418.2
See application file for complete search history.

(56) References Cited

OTHER PUBLICATIONS

Pasupulety et al., "A study on highly active Cu—Zn—Al—K catalyst for CO2 hydrogenation to methanol", Arabian Journal of Chemistry (2021) 14, 102951. (Year: 2021).*

Arellano-Treviño et al., "Bimetallic catalysts for CO2 capture and hydrogenation at simulated flue gas conditions", Chemical Engineering Journal, 2019, vol. 375, 121953, pp. 1-8.

Arellano-Treviño et al., "Catalysts and adsorbents for CO2 capture and conversion with dual function materials: Limitations of Ni-containing DFMs for flue gas applications", Journal of CO2 Utilization, 2019, vol. 31, pp. 143-151.

Bowker, "Methanol Synthesis from CO2 Hydrogenation", ChemCatChem, Sep. 2019, vol. 11, No. 17, pp. 4238-4246.

Cohen et al., "Using Light and Electrons to Bend Carbon Dioxide: Developing and Understanding Catalysts for CO2 Conversion to Fuels and Feedstocks", Accounts of Chemical Research, 2022, vol. 55, pp. 944-954.

Dasireddy et al., "Photocatalytic CO2 reduction to methanol over bismuth promoted BaTiO3 perovskite nanoparticle catalysts", Renewable Energy, 2022, vol. 195, pp. 885-895.

Duyar et al., "Dual function materials for CO2 capture and conversion using renewable H2", Applied Catalysis B: Environmental, 2015, vol. 168-169, pp. 370-376.

Duyar et al., "CO2 utilization with a novel dual function material (DFM) for capture and catalytic conversion to synthetic natural gas: An update", Journal of CO2 Utilization, 2016, vol. 15, pp. 65-71.

Fornero et al., "CO2 capture via catalytic hydrogenation to methanol: Thermodynamic limit vs. 'kinetic limit'", Catalysis Today, 2011, vol. 172, pp. 158-165.

Freyman et al., "Reactive CO2 capture: A path forward for process integration in carbon management", Joule, Apr. 2023, vol. 7, No. 4, pp. 631-651.

Han et al., "Atomically dispersed Ptn+ species as highly active sites in Pt/In2O3 catalysts for methanol synthesis from CO2 hydrogenation", Journal of Catalysis, 2021, vol. 394, pp. 236-244.

Ioannou et al., "Economic and Environmental Performance of an Integrated CO2 Refinery", ACS Sustainable Chemistry & Engineering, 2023, vol. 11, No. 5, pp. 1949-1961.

Jeong-Potter et al., "Dual function materials (Ru+Na2O/Al2O3) for direct air capture of CO2 and in situ catalytic methanation: The impact of realistic ambient conditions", Applied Catalysis B: Environmental, 2022, vol. 307, 120990, pp. 1-8.

Kar et al., "Integrative CO2 Capture and Hydrogenation to Methanol with Reusable Catalyst and Amine: Toward a Carbon Neutral Methanol Economy", Journal of the American Chemical Society, 2018, vol. 140, No. 5, pp. 1580-1583.

Kar et al., "Integrated CO2 Capture and Conversion to Formate and Methanol: Connecting Two Threads", Accounts of Chemical Research, 2019, vol. 52, No. 10, pp. 2892-2903.

Kothandaraman et al., "Integrated Capture and Conversion of CO2 to Methanol in a Post-Combustion Capture Solvent: Heterogeneous Catalysts for Selective C—N Bond Cleavage", Advanced Energy Materials, 2022, vol. 12, No. 46, 2202369, pp. 1-14.

Kowalik et al., "The effect of alkali metals doping on properties of Cu/ZnO/Al2O3 catalyst for water gas shift", Catalysis Today, 2011, vol. 176, No. 1, pp. 144-148.

Leonzio et al., "Methanol production by CO2 hydrogenation: Analysis and simulation of reactor performance", International Journal of Hydrogen Energy, 2019, vol. 44, No. 16, pp. 7915-7933.

Li et al., "Bimetallic catalysts for green methanol production via CO2 and renewable hydrogen: a mini-review and prospects", Catalysis Science & Technology, 2018, vol. 8, pp. 3450-3464.

Numpilai et al., "Tuning Interactions of Surface-adsorbed Species over Fe—Co/K—Al2O3 Catalyst by Different K Contents: Selective CO2 Hydrogenation to Light Olefins", ChemCatChem, 2020, vol. 12, No. 12, pp. 3306-3320.

Ojelade et al., "A Review on Pd Based Catalysts for CO2 Hydrogenation to Methanol: In-Depth Activity and DRIFTS Mechanistic Study", Catalysis Surveys from Asia, 2020, vol. 24, pp. 11-37.

Omodolor et al., "Dual-Function Materials for CO2 Capture and Conversion: A Review", Industrial & Engineering Chemistry Research, 2020, vol. 59, No. 40, pp. 17612-17631.

Pazdera et al., "Conversion of CO2 to methanol over bifunctional basic-metallic catalysts", Catalysis Communications, 2021, vol. 159, No. 106347, pp. 1-6.

Pazdera et al., "Impact of the Local Environment of Amines on the Activity for CO2 Hydrogenation over Bifunctional Basic—Metallic Catalysts", ChemCatChem, 2022, vol. 14, No. 18, e202200620, pp. 1-10.

Porta et al., Storage Material Effects on the Performance of Ru-Based CO 2 Capture and Methanation Dual Functioning Materials, Ind. Eng. Chem. Res., 2021, 60, 6706-6718.

Proaño et al., "In-situ DRIFTS study of two-step CO2 capture and catalytic methanation over Ru, Na2O"/Al2O3 Dual Functional Material, Applied Surface Science, 2019, vol. 479, pp. 25-30.

Ranjan et al., "Recent Advances in Carbon Dioxide Adsorption, Activation and Hydrogenation to Methanol using Transition MetalCarbides", ChemSusChem, 2022, vol. 15, e202201183, pp. 1-37.

Santiago et al., "Synthesis of MeOH and DME From CO2 Hydrogenation Over Commercial and Modified Catalysts", Frontiers in Chemistry, Jun. 2022, vol. 10, Article 903053, pp. 1-11.

Sen et al., "Glycol assisted efficient conversion of CO2 captured from air to methanol with a heterogeneous Cu/ZnO/Al2O3 catalyst", Journal of CO2 Utilization, 2021, 54, 101762.

Sen et al., Integrated carbon capture and utilization to methanol with epoxide-functionalized polyamines under homogeneous catalytic conditions, Journal of Organometallic Chemistry, 2022, vols. 965-966, 122331, pp. 1-7.

Siegel et al., Reactive Capture of CO2□: Opportunities and Challenges, ACS Catalysis, 2023, vol. 13, No. 1, pp. 766-784.

Smyrnioti et al., Study of CO2 adsorption on a commercial CuO/ZnO/Al2O3 catalyst, Catalysis Today, 2020, vol. 357, pp. 495-502.

Sollai et al., "Renewable methanol production from green hydrogen and captured CO2: A techno-economic assessment", Journal of CO2 Utilization, 2023, vol. 68, 102345, pp. 1-12.

Studt et al., "The Mechanism of CO and CO2 Hydrogenation to Methanol over Cu-Based Catalysts", ChemCatChem, 2015, vol. 7, No. 7, pp. 1105-1111.

Sun et al., "Highly active Pt/In2O3—ZrO2 catalyst for CO2 hydrogenation to methanol with enhanced CO tolerance: The effects of ZrO2", Applied Catalysis B: Environmental, 2023, vol. 320, 122018, pp. 1-12.

To et al., Direct synthesis of branched hydrocarbons from CO2 over composite catalysts in a single reactor, Journal of CO2 Utilization, 2022, vol. 66, 102261, pp. 1-9.

Wang et al., "Parametric, cyclic aging and characterization studies for CO2 capture from flue gas and catalytic conversion to synthetic

(56) References Cited

OTHER PUBLICATIONS natural gas using a dual functional material (DFM)", Journal of CO2 Utilization, 2018, vol. 27, pp. 390-397.

Wirner et al., "Combined capture and reduction of CO2 to methanol using a dual-bed packed reactor", Chemical Engineering Journal, 2023, vol. 470, 144227, pp. 1-6.

Wu et al., "Mechanistic insight into the catalytically active phase of CO2 hydrogenation on Cu/ZnO catalyst", Applied Surface Science, 2020, vol. 525, 146481, pp. 1-9.

Yang et al., "DFT approach to the stability, the structural, electronic and photocatalytic properties of the ZnV2O6(001) surface terminations", Materials Science in Semiconductor Processing, 2023, vol. 155, 107220, pp. 1-9.

Yousaf et al., "Rapid and highly selective conversion of CO2 to methanol by heterometallicporous ZIF-8", Journal of CO2 Utilization, 2022, vol. 64, 102172, pp. 1-18.

Zhou et al., "New horizon in C1 chemistry: breaking the selectivity limitation in transformation of syngas and hydrogenation of CO2 into hydrocarbon chemicals and fuels", Chemical Society Reviews, Jun. 2019, vol. 48, No. 12, pp. 3147-3426.

Zhou et al., "Comparative investigation of CO2-to-methanol process using different CO2capture technologies", Fuel, 2023, vol. 338, 127359, pp. 1-14.

* cited by examiner

100B

130

120

110A

110B

115A

115B

125

135

140

147

145

A)

B)

MATERIALS, METHODS, AND SYSTEMS FOR REACTIVE CAPTURE AND CONVERSION OF CO₂

CROSS-REFERENCE TO RELATED APPLICATIONS

This application claims priority from U.S. Provisional Patent Application No. 63/508,797 filed on Jun. 16, 2023, the contents of which are incorporated herein by reference in the entirety.

CONTRACTUAL ORIGIN

This invention was made with government support under Contract No. DE-AC36-08GO28308 awarded by the Department of Energy. The government has certain rights in the invention.

BACKGROUND

Among various $CO_2$ removal strategies, carbon capture and storage (CCS) technologies are currently commercially available. However, widespread implementation of CCS is still limited due to high capture costs and the low intrinsic value of $CO_2$. Carbon capture and utilization (CCU) overcomes these disadvantages by providing a revenue stream to offset capture costs by converting $CO_2$ to more valuable chemicals and fuels. However, the benefits of CCU are hindered by the many energetic penalties one must pay during the process, such as the energy-intensive desorption of the captured $CO_2$ during material regeneration (60-100 kJ/mol) and the associated purification, transport, and pressurization of $CO_2$ from dilute sources. In this sense, a reactive carbon capture (RCC) approach, where absorbed/adsorbed $CO_2$ is directly converted to products during the absorbate/adsorbate regeneration step, has the potential to eliminate the need for $CO_2$ desorption and downstream processes, thereby providing a route to reduced cost and reduced energy input to the process.

Therefore, a new approach in the design of dual functional materials (DFMs) is needed to (1) employ catalysts that enable the conversion of $CO_2$ to more valuable products, such as methanol, and (2) operate at more mild conditions that favor lower capital and operating expenses and offer compatibility with a dynamic energy grid to provide favorable process economics.

SUMMARY

An aspect of the present disclosure is a composition that includes a first oxide that includes zinc, aluminum, and copper; and a metal that includes least one of an alkali metal and/or an alkaline earth metal, where the composition has a first total uptake capacity of $CO_2$ of greater than 218 mol $CO_2$/g of composition at a first temperature of about 40° C., a second total uptake capacity of $CO_2$ of greater than 76 μmol $CO_2$/g of composition at a second temperature of about 300° C., and the composition is capable of converting $CO_2$ to at least one of CO, methane, or methanol, when exposed to $H_2$ at a third temperature greater than the first temperature. In some embodiments of the present disclosure, the first uptake capacity may be between 218 μmol $CO_2$/g of composition and 300 μmol $CO_2$/g of composition. In some embodiments of the present disclosure, the second uptake capacity may be between 76 μmol $CO_2$/g of composition and 250 μmol $CO_2$/g of composition.

In some embodiments of the present disclosure, the first oxide may include CuO, ZnO, and $Al_2O_3$. In some embodiments of the present disclosure, at least a portion of the first oxide may be in a crystalline phase. In some embodiments of the present disclosure, the metal may include at least one of magnesium, calcium, barium, strontium, lithium, sodium, potassium, rubidium, and/or cesium. In some embodiments of the present disclosure, the metal may be in the form of at least one of a second oxide and/or a cation. In some embodiments of the present disclosure, the second oxide may be present at a concentration between 1 wt % and 10 wt %, inclusively. In some embodiments of the present disclosure, the second oxide and/or cation may include at least one of $Ca^{2+}$, CaO, $Ca(OH)_2$, $Na^+$, NaOH, $Na_2O$, $K^+$, KOH, and/or $K_2O$. In some embodiments of the present disclosure, the second oxide may be amorphous and include at least one of CaO, $Ca(OH)_2$, NaOH, $Na_2O$, KOH, and/or $K_2O$. In some embodiments of the present disclosure, the second oxide may be dispersed on the surface of the first oxide. In some embodiments of the present disclosure, the metal may include sodium at a concentration between 5 wt % and 10 wt % present as $Na_2O$ dispersed on the first oxide.

An aspect of the present disclosure is a composition that includes a first oxide that includes zinc and aluminum and a metal that includes at least one of an alkali metal and/or an alkaline earth metal, where the composition has a first total uptake capacity of $CO_2$ of greater than 228 μmol $CO_2$/g of composition at a first temperature of about 40° C., a second total uptake capacity of $CO_2$ of greater than 106 μmol $CO_2$/g of composition at a second temperature of about 300° C., and the composition is capable of converting $CO_2$ to at least one of CO, methane, or methanol, when exposed to $H_2$ at a third temperature greater than the first temperature. In some embodiments of the present disclosure, the first uptake capacity may be between 228 μmol $CO_2$/g of composition and 398 μmol $CO_2$/g of composition. In some embodiments of the present disclosure, the second uptake capacity may be between 106 μmol $CO_2$/g of composition and 250 μmol $CO_2$/g of composition. In some embodiments of the present disclosure, the zinc and the aluminum may be present at a ratio of Zn:Al between 2:4:1 and 1:2.4 on a weight basis.

An aspect of the present disclosure is a method for reducing $CO_2$, utilizing a solid composition, where the method includes a first contacting of the solid composition with $CO_2$ at a first temperature and a first pressure, resulting in chemisorption of the $CO_2$ onto the composition and a second contacting of the solid composition with $H_2$ at a second temperature and a second pressure, resulting in a portion of the chemisorbed $CO_2$ reacting to form at least one of CO, methane, or methanol, where the first temperature is between 0° C. and 450° C., the first pressure is between 0.8 bar and 30 bar (absolute), the second temperature is between 50° C. and 450° C., and the second pressure is between 0.8 bar and 30 bar (absolute).

An aspect of the present disclosure is a method for reducing $CO_2$, utilizing an Na/CZA composition, where the method includes a first contacting of the Na/CZA composition with $CO_2$ at a temperature between 50° C. and 100° C. and a first pressure less than or equal to 2 bar, resulting in chemisorption of the $CO_2$ onto the composition and a second contacting of the Na/CZA composition with $H_2$ at a second temperature between 200° C. and 225° C. and a second pressure between 10 bar and 30 bar (absolute), resulting in a portion of the chemisorbed $CO_2$ reacting to form at least one of CO, methane, or methanol.

An aspect of the present disclosure is a method for reducing $CO_2$ under isothermal and isobaric conditions, utilizing a K/ZA composition, where the method includes a first contacting of the K/ZA composition with $CO_2$ at a temperature between 300° C. and 350° C. and a first pressure less than or equal to 2 bar, resulting in chemisorption of the $CO_2$ onto the composition and a second contacting of the K/ZA composition with $H_2$ at the same temperature between 300° C. and 350° C. and a second pressure less than or equal to 2 bar, resulting in a portion of the chemisorbed $CO_2$ reacting to form at least one of CO, methane, or methanol.

An aspect of the present disclosure is a method for reducing $CO_2$, utilizing the K/ZA composition, where the method includes a first contacting of the K/ZA composition with $CO_2$ at a temperature between 50° C. and 150° C. and a first pressure less than or equal to 2 bar, resulting in chemisorption of the $CO_2$ onto the composition and a second contacting of the K/ZA composition with $H_2$ at a second temperature between 300° C. and 450° C. and a second pressure between 1 bar and 30 bar (absolute), resulting in a portion of the chemisorbed $CO_2$ reacting to form at least one of CO, methane, or methanol.

BRIEF DESCRIPTION OF DRAWINGS

Some embodiments are illustrated in referenced figures of the drawings. It is intended that the embodiments and figures disclosed herein are to be considered illustrative rather than limiting.

FIG. 7 illustrates $CO_2$ chemisorption and productivity ($mmol/g_{DFM}$) of all products, including desorbed $CO_2$ during $CO_2$ capture/conversion cycles over CZA, Ca/CZA, K/CZA and Na/CZA solid compositions, according to some embodiments of the present disclosure. $CO_2$ contacting with the solids (i.e., $CO_2$ capture by the solids) was completed at 100° C. and atmospheric pressure followed by hydrogenation (i.e., conversion or reactive desorption) at 250° C. and 30 bar for 2 hours and hydrogenation at atm pressure for 1 hours. Pretreatment: 250° C. in $H_2$ for 8 h.

Figure 8:
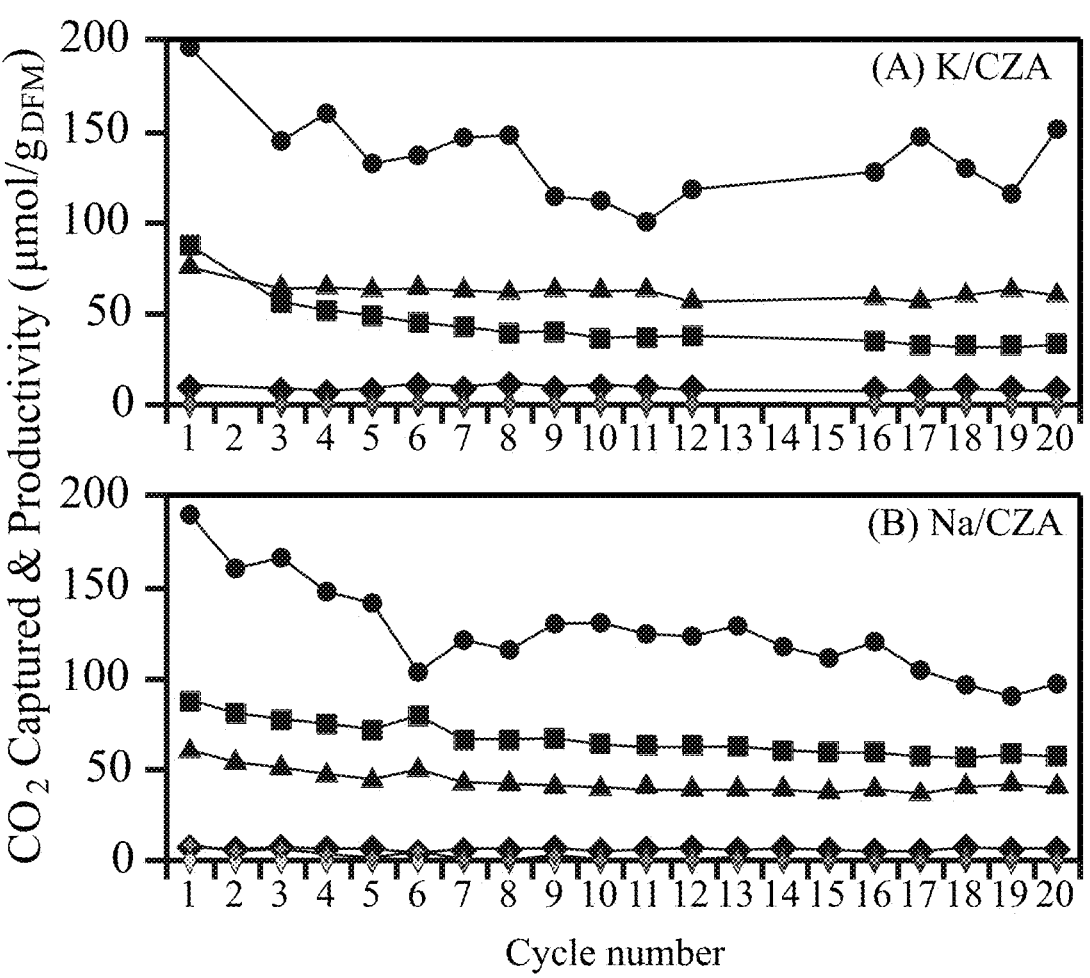

FIG. 8 illustrates reactive carbon capture testing results from 20 cycles on (Panel A) K/CZA solid and (Panel B) Na/CZA solid, according to some embodiments of the present disclosure.

Figure 9:
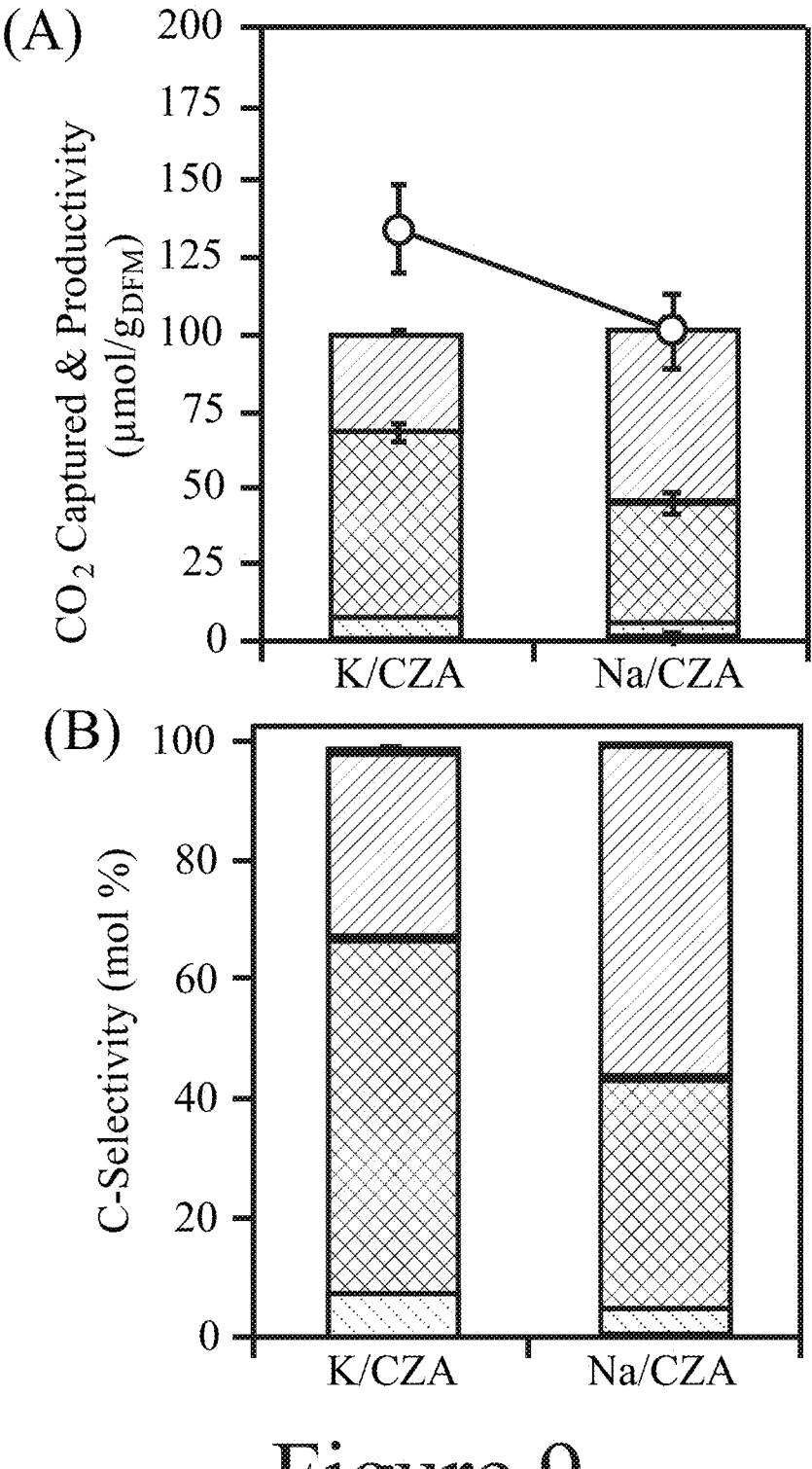

FIG. 9 illustrates average performances over the last 5 cycles during 20-cycle carbon capture/conversion testing on K/CZA solid and Na/CZA solid, according to some embodiments of the present disclosure.

Figure 10:
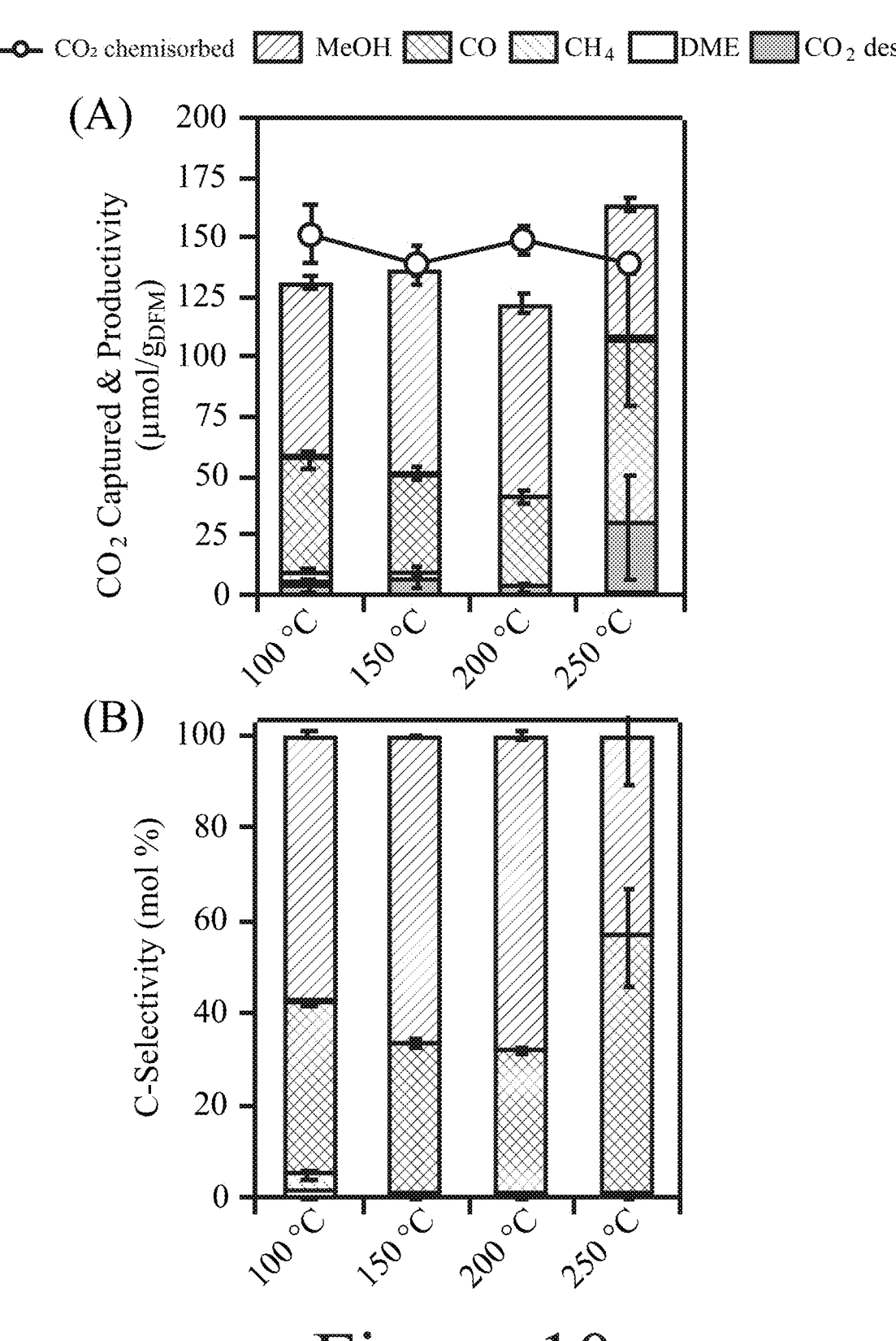

FIG. 10 illustrates (Panel A) $CO_2$ chemisorption (markers) and product yield (stacked bars), and (Panel B) C-selectivity of all products during reactive carbon capture over 5-Na/CZA at varying contacting temperatures, according to some embodiments of the present disclosure. Data are averages of the last 3 cycles with standard deviations. $CO_2$ capture followed by an inert purge was performed at T=100-250° C. and 0.8 bar pressure; reactive desorption was performed in pure $H_2$ at 250° C. and 30 bar for 2 hours followed by pressure release and purge at 0.8 bar pressure for 1 hour.

Figure 11:
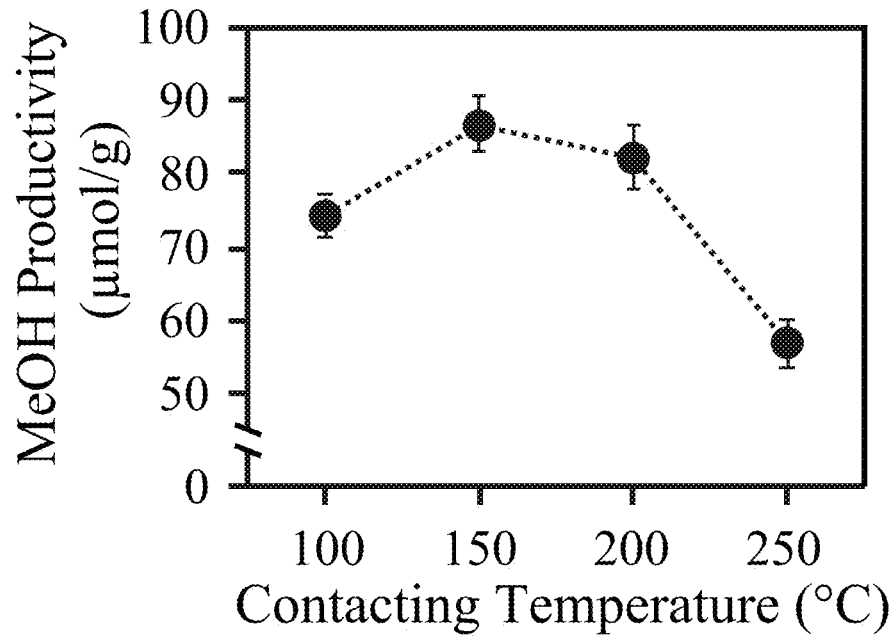
Figure 11:
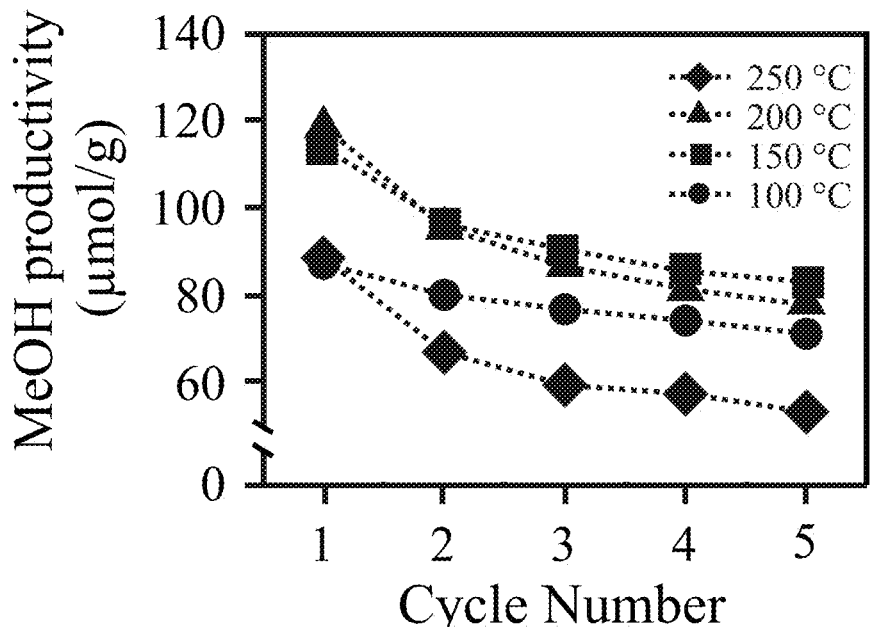

FIG. 11 illustrates (Panel A) average MeOH yield during carbon capture/conversion cycles with varying contacting/$CO_2$ capture temperatures and (Panel B) MeOH yield during each of the 5 cycles performed with varying conversion temperatures, according to some embodiments of the present disclosure.

Figure 12:
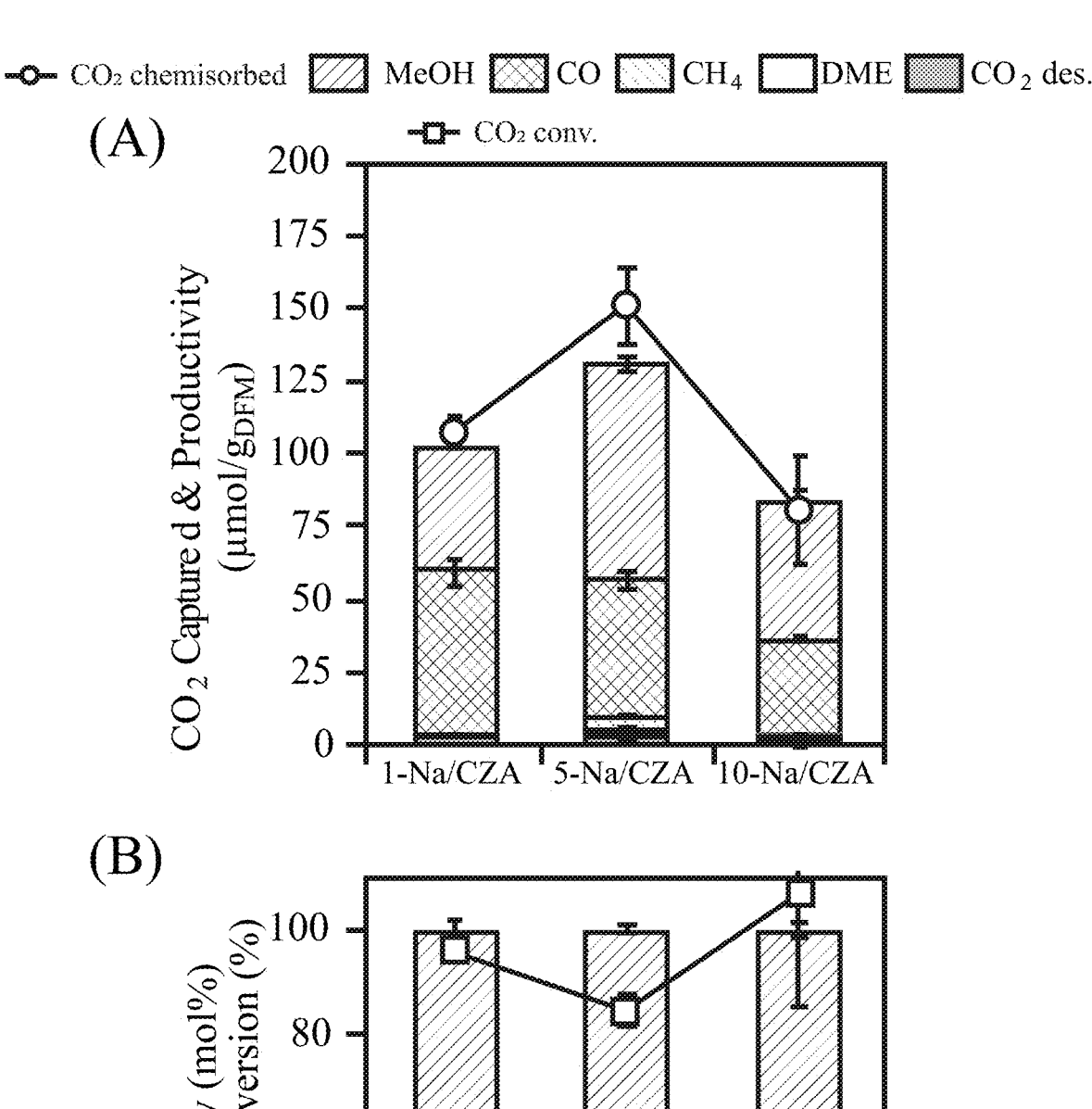

FIG. 12 illustrates (Panel A) $CO_2$ chemisorption (circle markers) and product yield (stacked bars), and (Panel B) C-selectivity of all products during reactive carbon capture cycles using Na/CZA solids having varying Na loadings, according to some embodiments of the present disclosure. Data are averages of the last 3 cycles with standard deviations. $CO_2$ capture was followed by an inert purge performed at 100° C. and 0.8 bar pressure; reactive desorption was performed in pure $H_2$ at 250° C. and 30 bar for 2 hours followed by pressure release and purge at 0.8 bar pressure for 1 hour.

Figure 13:
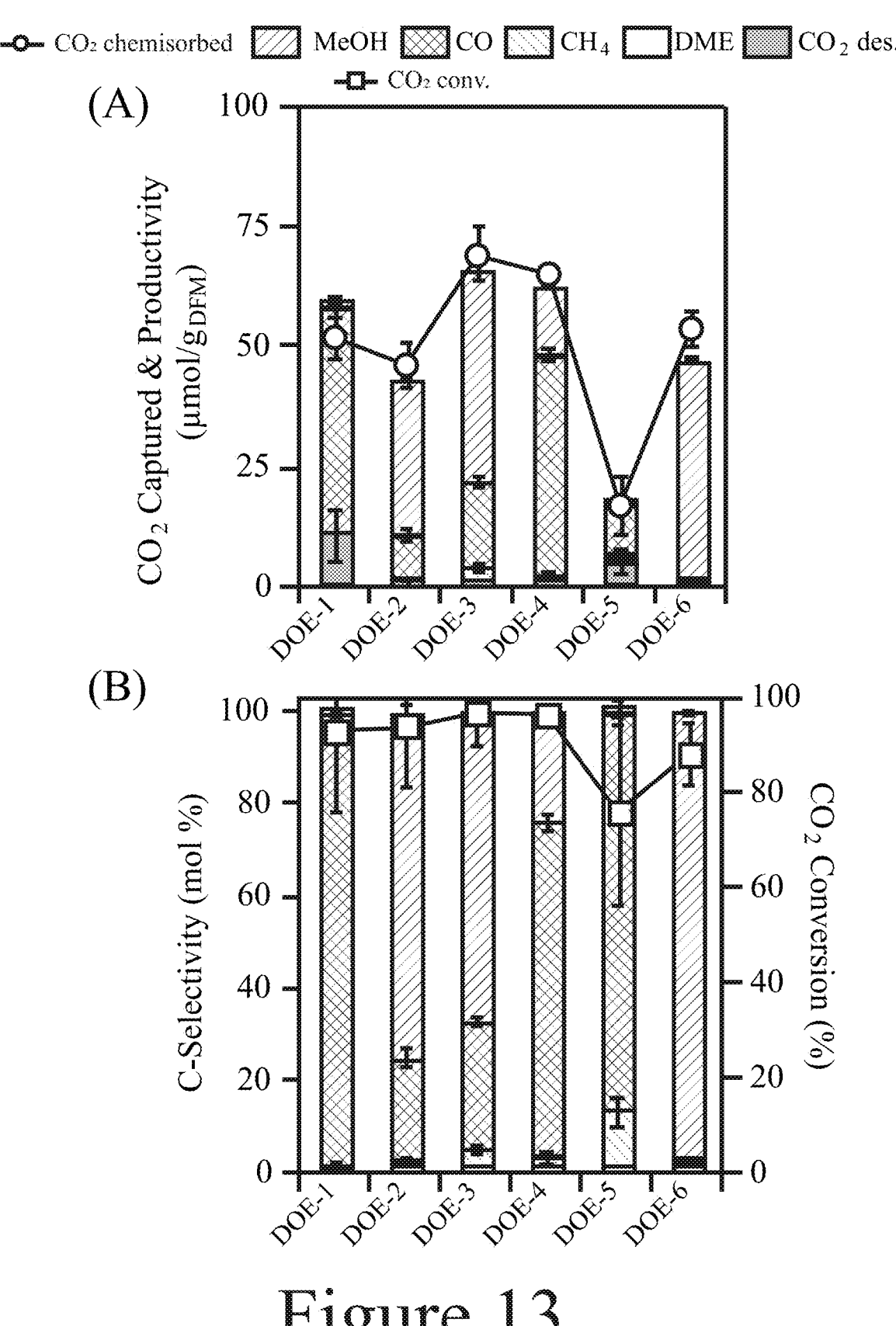

FIG. 13 illustrates a parametric study of reactive desorption conditions of temperature, pressure, and $H_2$ concentration on 10-Na/CZA solids, according to some embodiments of the present disclosure. (Panel A) $CO_2$ capture and product yield and (Panel B) C-selectivity and $CO_2$ conversion. Data is the average of the last 3 cycles from a 5-cycle experiment. $CO_2$ capture was performed at 100° C. and atm pressure followed by reactive desorption at varying conditions as shown in Table 4.

Figure 14:
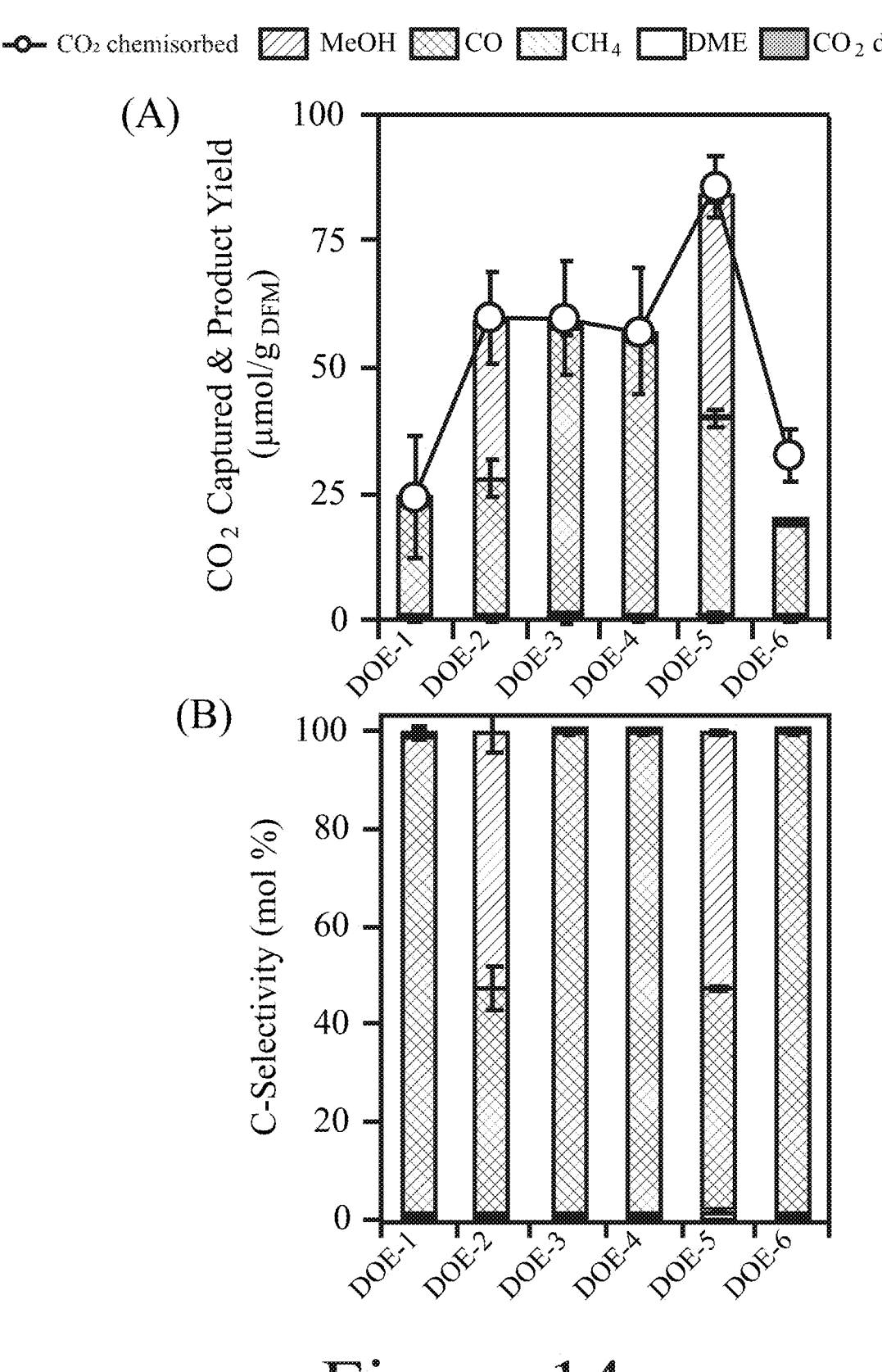

FIG. 14 illustrates a parametric study of reactive desorption conditions of temperature, pressure, and $H_2$ concentration on 5-Na/CZA, according to some embodiments of the present disclosure. (Panel A) $CO_2$ capture and product yield and (Panel B) C-selectivity and $CO_2$ conversion. Data is the average of the last 3 cycles from a 5-cycle experiment. $CO_2$ capture was performed at 100° C. and atm pressure followed by conversion at varying conditions as shown in Table 5.

Figure 15:
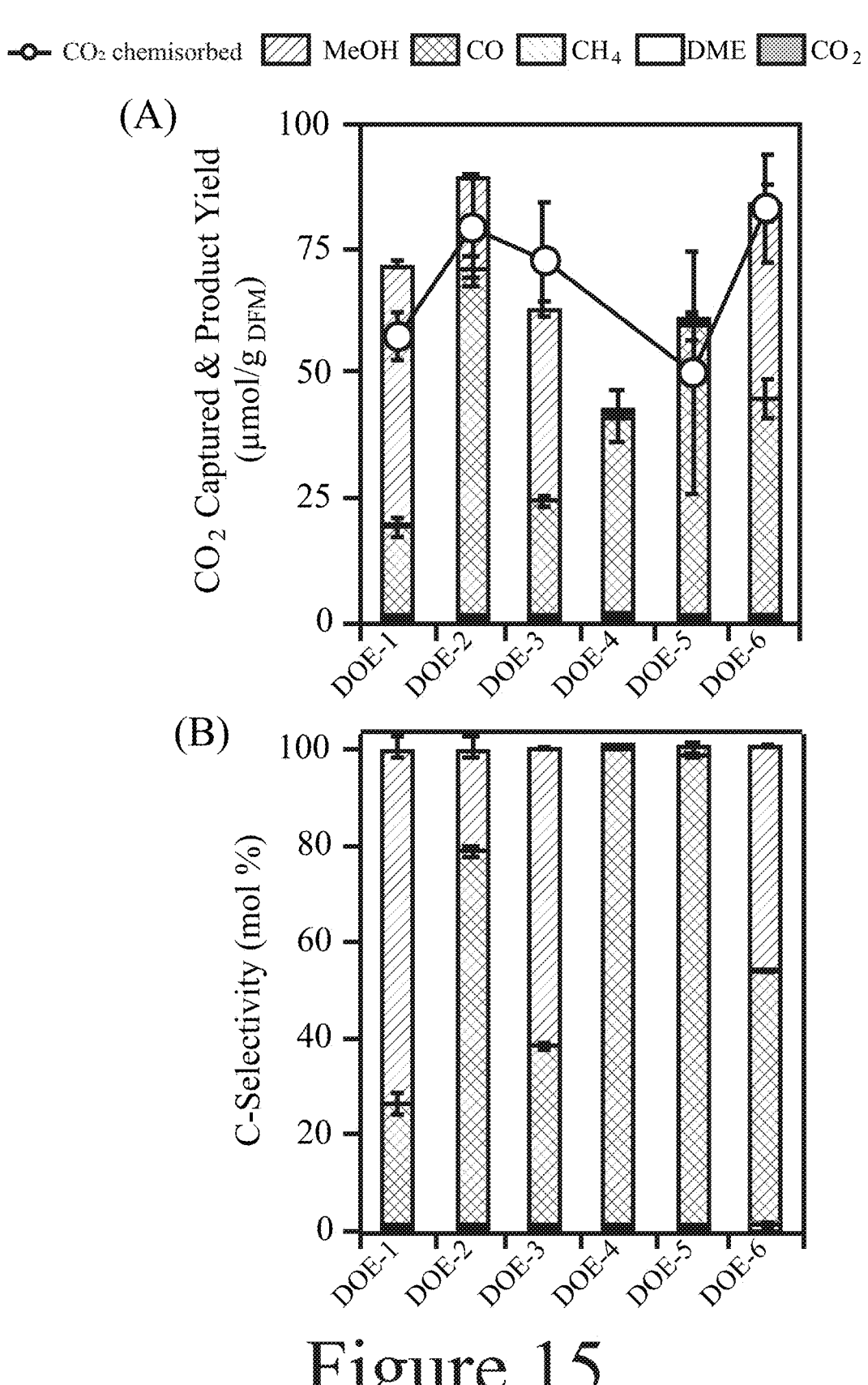

FIG. 15 illustrates a parametric study of reactive desorption conditions of temperature, pressure, and $H_2$ concentration using 1-Na/CZA solids, according to some embodiments of the present disclosure. (a) $CO_2$ capture and product yield and (b) C-selectivity and $CO_2$ conversion. Data is the average of the last 3 cycles from a 5-cycle experiment. $CO_2$ contacting/capture was performed at 100° C. and atmospheric pressure followed by conversion at varying conditions as shown in Table 6.

Figure 16:
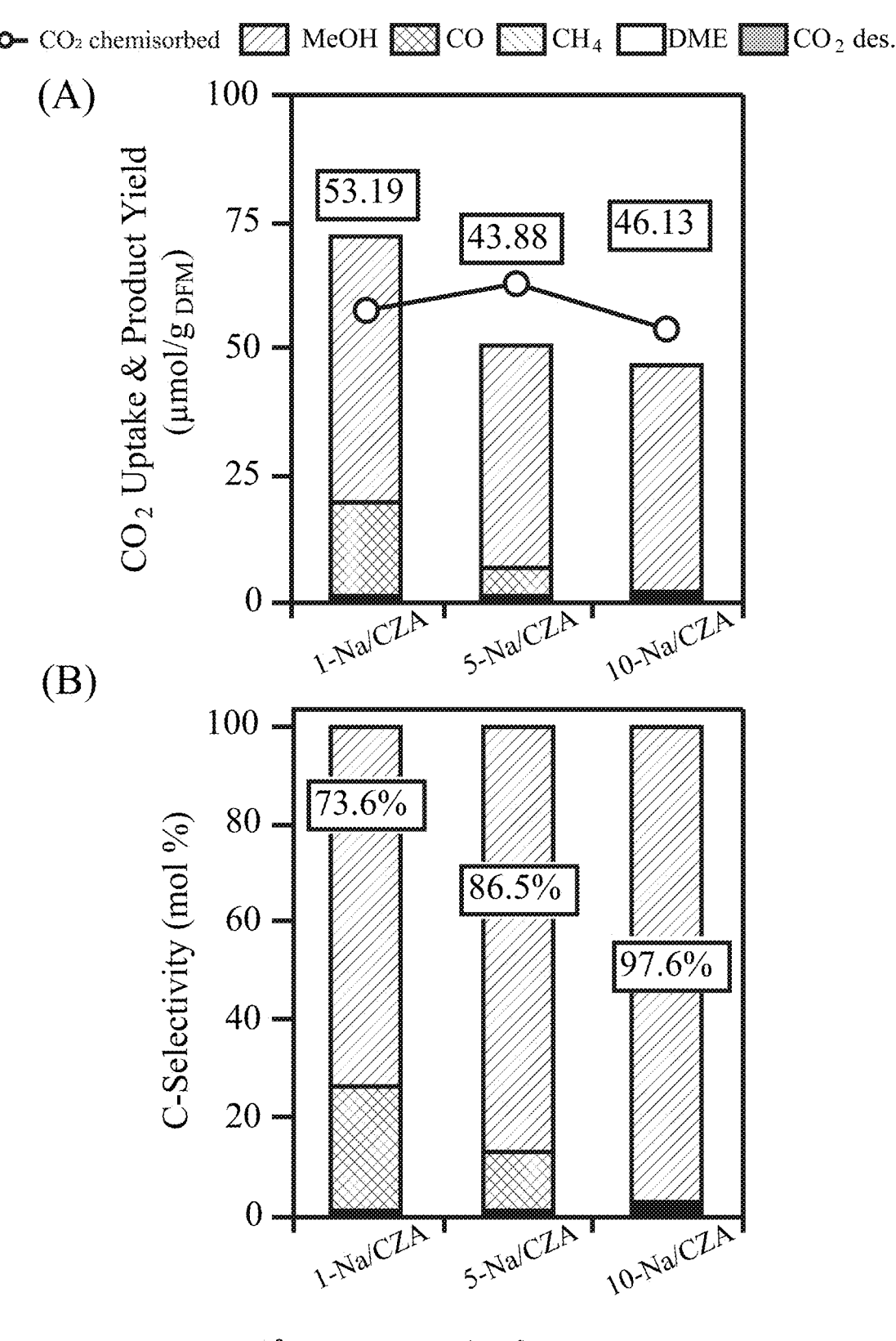

FIG. 16 illustrates performance metrics from high pressure (30 bar), low conversion temperature (200° C.), and high $H_2$ concentration (100%) cycles Na/CZA solid compositions, according to some embodiments of the present disclosure. (Panel A) $CO_2$ capture and product yield and (Panel B) C-selectivity. The values above the bars in (Panel A) are MeOH yield and values in bars in (Panel B) are MeOH selectivity. Data is the average of the last 3 cycles from a 5-cycle experiment. $CO_2$ capture/contacting was performed at 100° C. and atm pressure.

Figure 17:
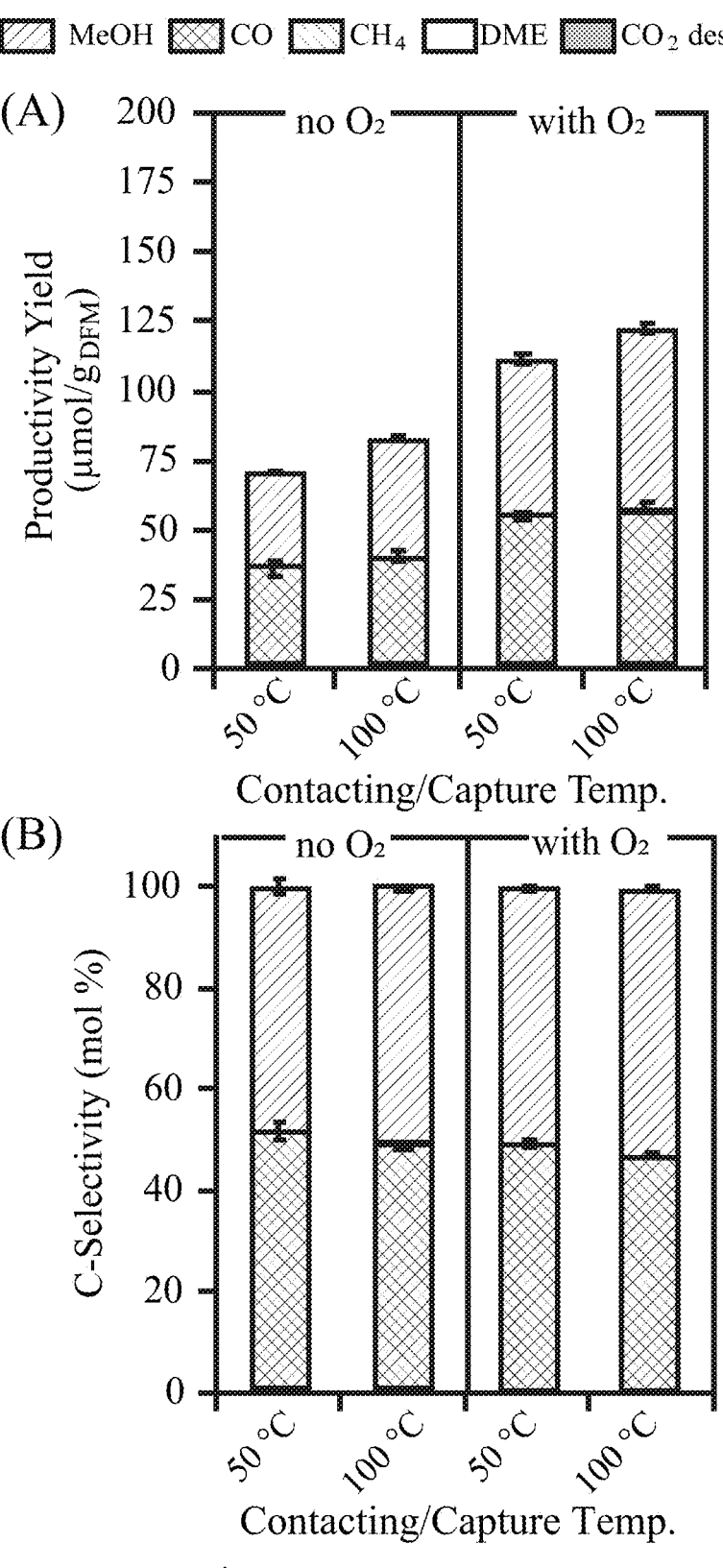

FIG. 17 illustrates (Panel A) product yield (stacked bars), and (Panel B) C-selectivity of all products during reactive carbon capture cycles using 5-Na/CZA solid compositions at contacting temperatures of 50° C. and 100° C. without (1% $CO_2$, 99% $N_2$) and with co-fed $O_2$ during the $CO_2$ contacting step (1% $CO_2$, 5% $O_2$, 94% $N_2$), according to some embodiments of the present disclosure. Data are averages of the last 3 cycles with standard deviations. $CO_2$ capture was followed by an inert purge performed at T=50° C. or 100° C. and 0.8 bar pressure; reactive desorption was performed in pure $H_2$ at 250° C. and 30 bar for 2 hours followed by pressure release and purge at 0.8 bar pressure for 1 hour.

Figure 18:
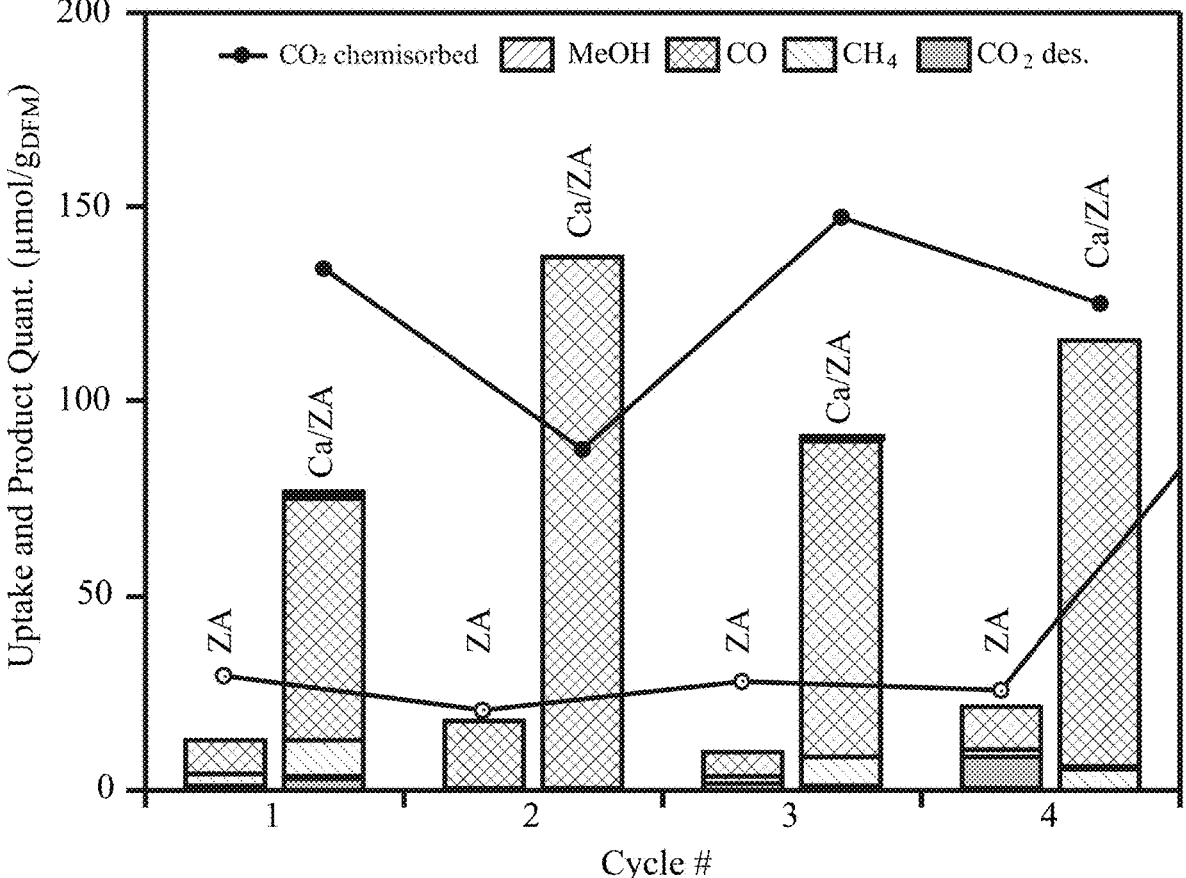

FIG. 18 illustrates $CO_2$ chemisorption and productivity (mmol/$g_{DFM}$) of all products, including desorbed $CO_2$ during capture/conversion cycles over ZA solids and Ca/ZA solids, according to some embodiments of the present disclosure. Pretreatment: 400° C. in 30 sccm $H_2$ for 7 hours.

Figure 19:
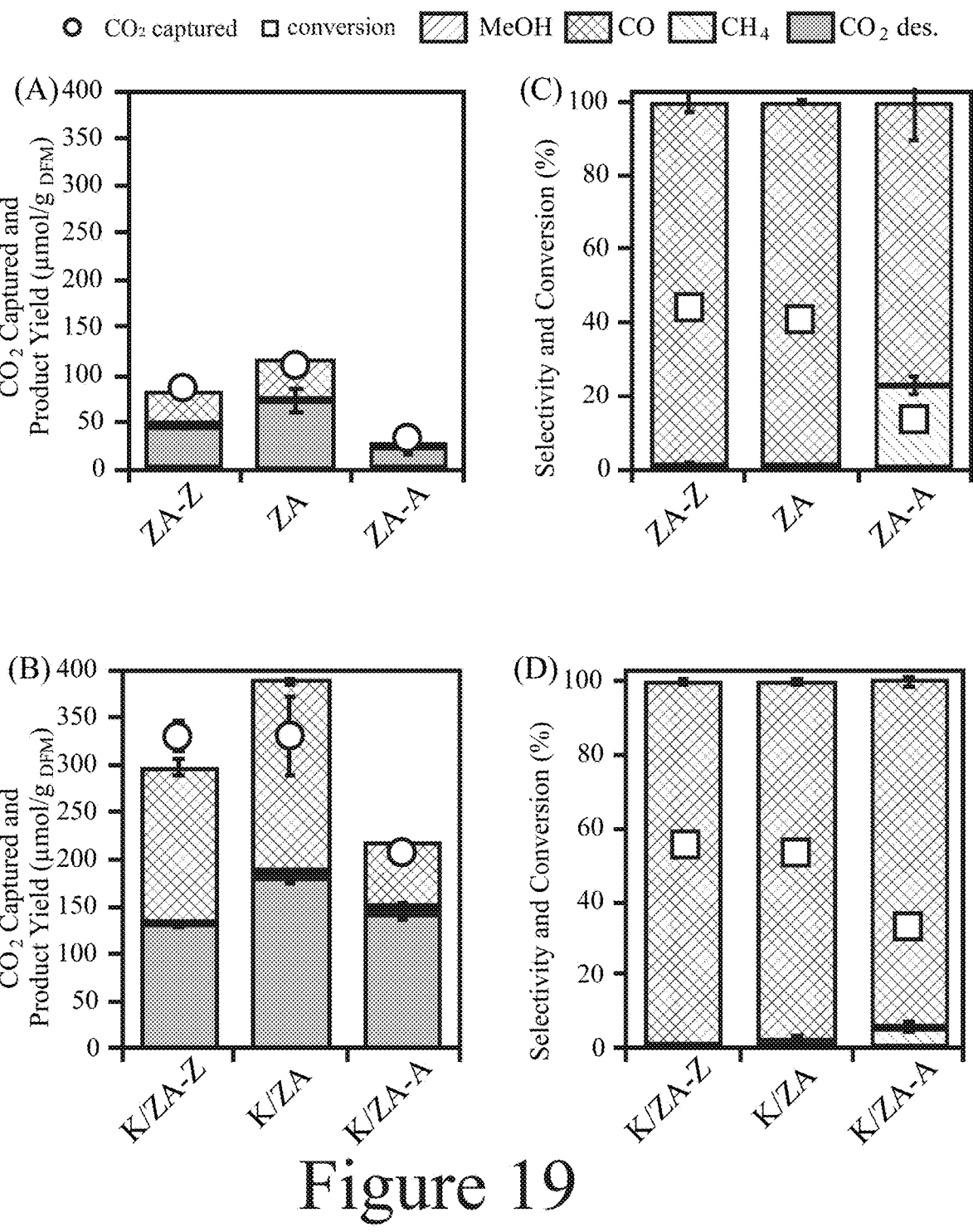

FIG. 19 illustrates (Panels A and B) $CO_2$ capture and product yield and (Panels C and D) C-selectivity and $CO_2$ conversion for the unmodified and K-doped ZA-Z, ZA, and ZA-A solid compositions as noted in the x-axis, according to some embodiments of the present disclosure.

Figure 20:
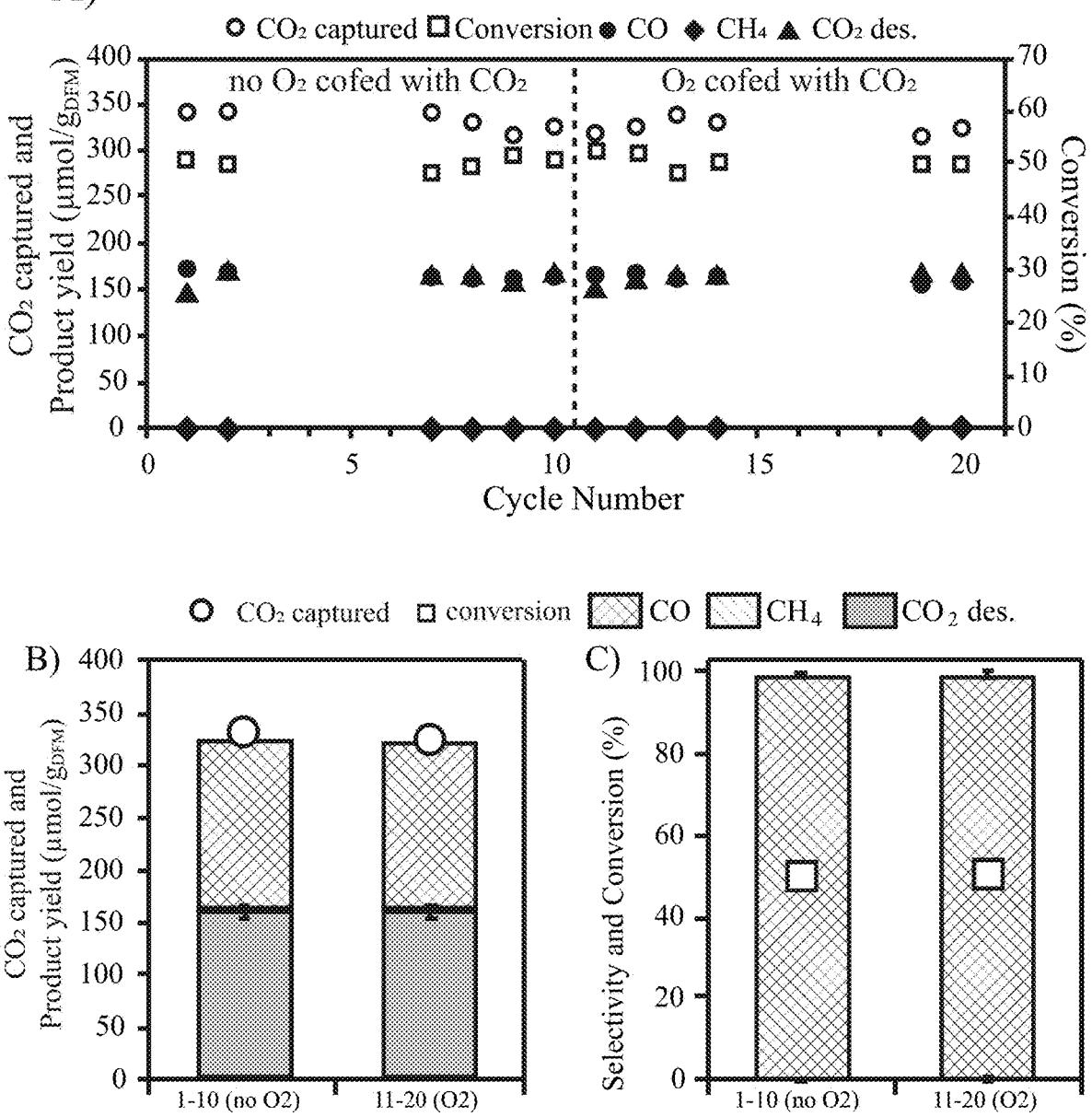

FIG. 20 illustrates (Panel A) $CO_2$ capture, product yield, and $CO_2$ conversion collected over the last 20 capture/conversion cycles; average results of (Panel B) $CO_2$ capture and product yield and (Panel c) C-selectivity and $CO_2$ conversion for K/ZA solid compositions after 10 capture/conversion cycles without co-fed $O_2$, followed by 10 capture/conversion cycles with co-fed $O_2$, according to some embodiments of the present disclosure.

Figure 21:
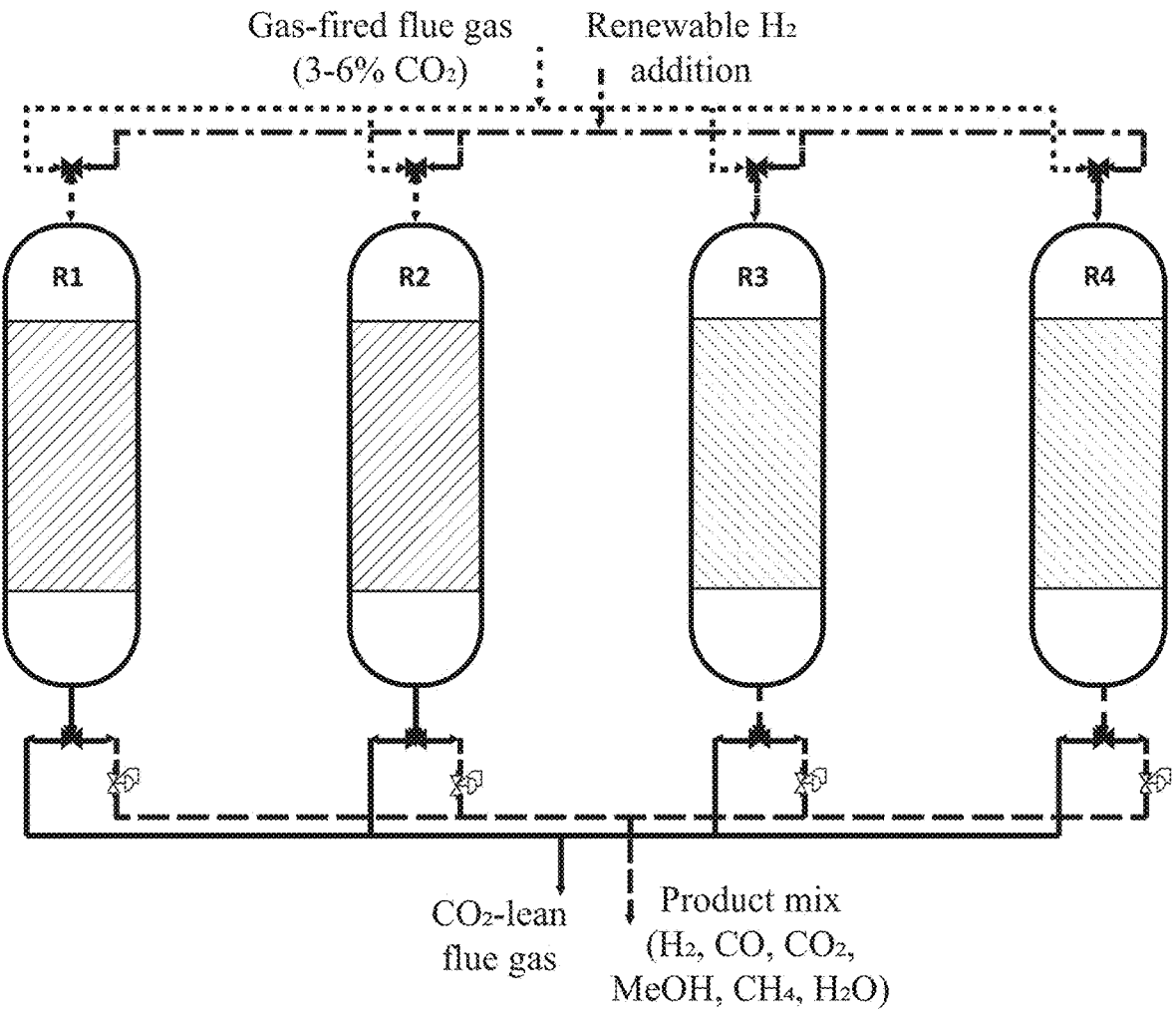

FIG. 21 illustrates a flow diagram of a single-pass RCC process, according to some embodiments of the present disclosure.

Figure 22:
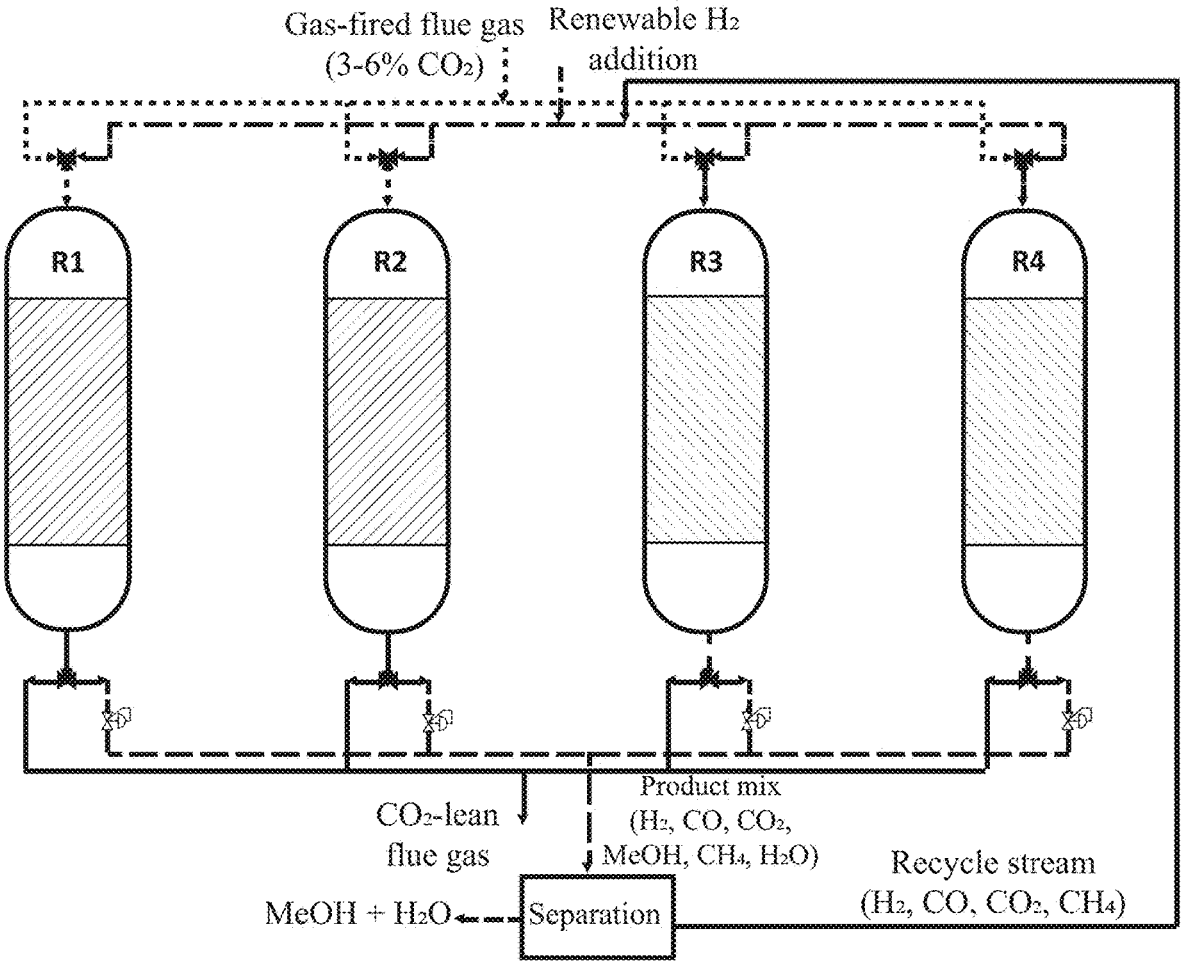

FIG. 22 illustrates a flow diagram of RCC process with product separation and recycle of light gases to the reactive desorption reactors, according to some embodiments of the present disclosure.

Figure 23:
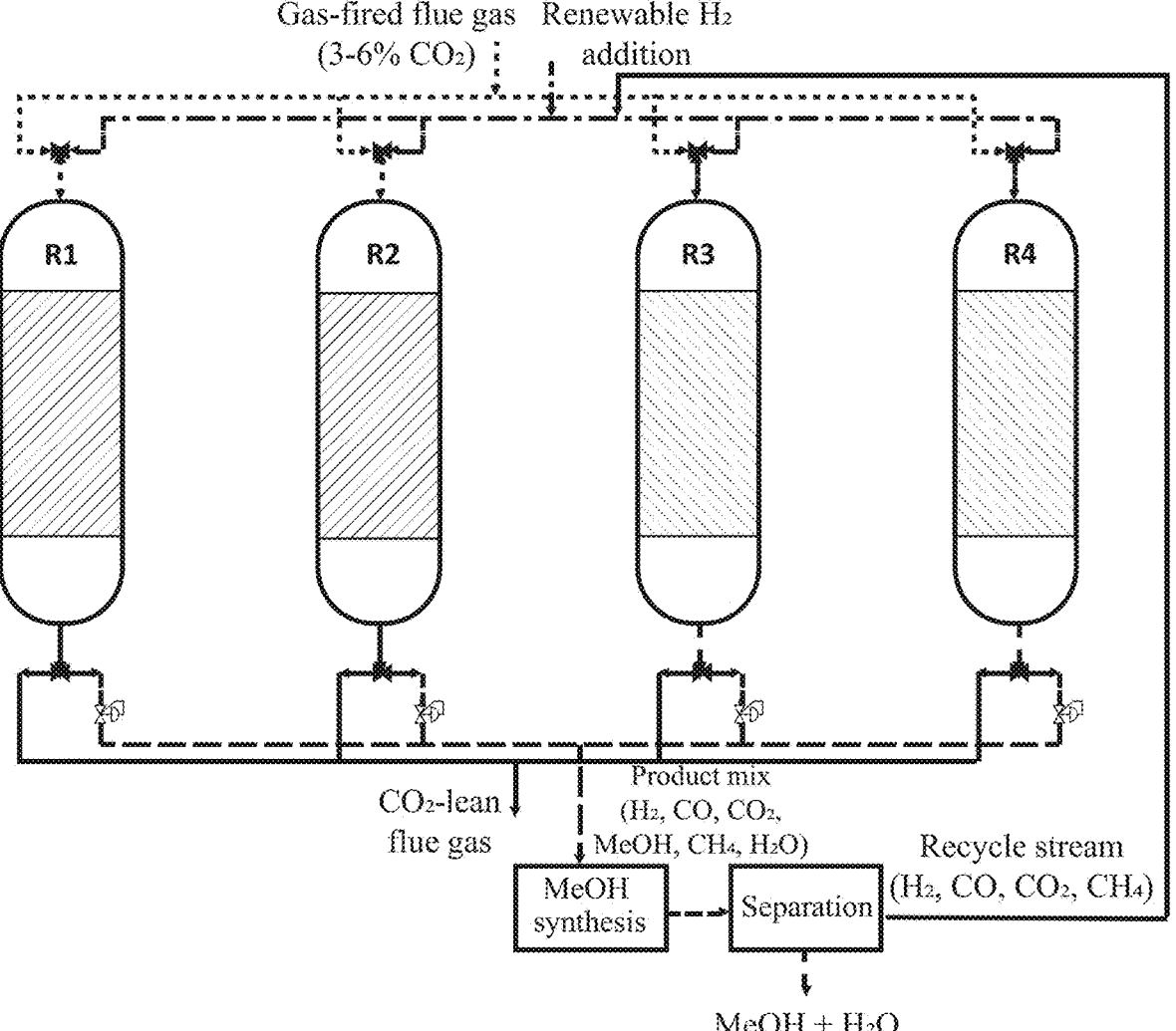

FIG. 23 illustrates a flow diagram of RCC process making CO as the primary product from $CO_2$ with downstream methanol synthesis reactor to convert syngas, with product separation and recycle of light gases to the reactive desorption reactors, according to some embodiments of the present disclosure.

To facilitate understanding, identical reference numerals have been used, where possible, to designate identical elements that are common to the figures. It is contemplated that elements and features of one embodiment may be beneficially incorporated in other embodiments without further recitation.

| REFERENCE NUMERALS | |
| --- | --- |
| 100 | system |
| 110 | packed bed reactor |
| 115 | solid |
| 120 | $CO_2$ rich stream |

-continued

| REFERENCE NUMERALS | |
| --- | --- |
| 125 | $CO_2$ lean stream |
| 130 | $H_2$ stream |
| 135, 145, and 155 | product stream |
| 140 | separator |
| 147 | recycle stream |
| 150 | reactor |
| 200 | method |
| 210 | first contacting |
| 220 | second contacting |
| 230 | reacting |
| 240 | separating |

DETAILED DESCRIPTION

Described herein are solid compositions that both capture $CO_2$ and convert the captured $CO_2$ to at least one of methanol, CO, and/or $CH_4$. These solid compositions were tested for both $CO_2$ capture and $CO_2$ conversion using temperature-and-pressure swing reactive carbon capture systems and methods.

In general, the compositions described herein may be referred to as dual-functional materials and/or multi-functional materials because they both "capture", i.e., remove, $CO_2$ from a gas stream passed over the compositions and "convert", i.e., react, the captured $CO_2$ to form desirable products such as methanol, carbon monoxide, and methane. In some embodiments of the present disclosure, the conversion of $CO_2$ to desirable products utilizes the addition of $H_2$. Further, as described below in more detail, in some embodiments of the present disclosure, a product stream from a system and/or method, resulting from the capture and conversion of $CO_2$, may be directed to a downstream reactor to react less desirable products such as CO and/or methane to more desirable products such as methanol. In addition, as described below in more detail, in some embodiments of the present disclosure, a product stream from a system and/or method, resulting from the capture and conversion of $CO_2$, may be directed to a downstream separator to separate at least one of unreacted $H_2$ for recycle and/or separate less desirable products such as CO and/or methane from more desirable products such as methanol and/or unreacted $H_2$.

Figure 1A:
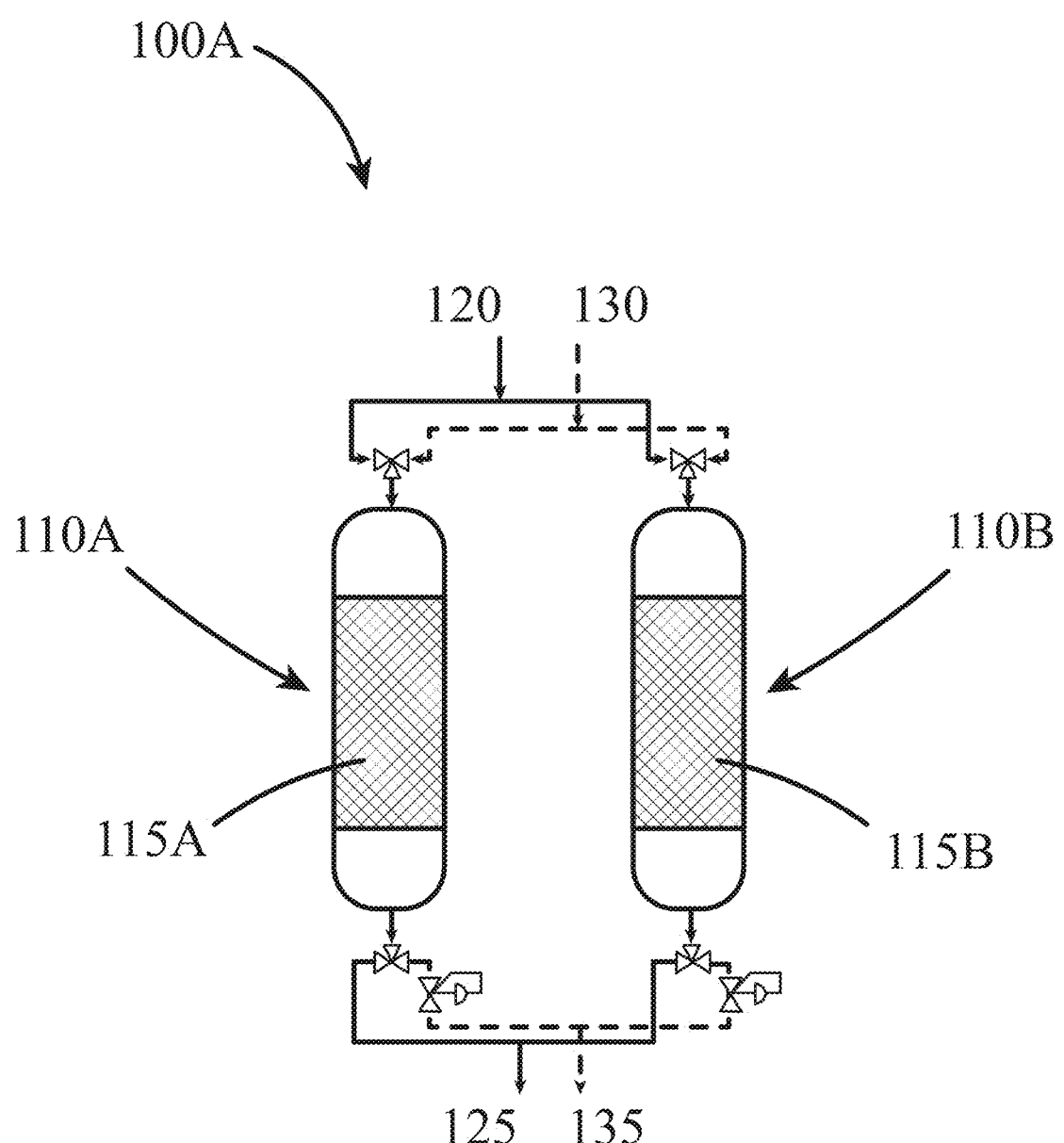
FIGS. 1A-1C illustrate systems configured to capture and convert $CO_2$ to products such as methanol, CO, and/or methane, according to some embodiments of the present disclosure.

FIG. 1A illustrates a system 100A configured to capture and convert $CO_2$ to products such as methanol, CO, and/or methane, according to some embodiments of the present disclosure. This exemplary system 100A includes two packed bed reactors 110A and 110B configured to operate simultaneously and in parallel. Each reactor 110A and 110B is "packed", i.e., at least partially filled, with a solid, 115A and 115B, respectively, which is designed to capture and convert $CO_2$ to at least one product; e.g., at least one of methanol, CO, and/or methane. The solids 115A and 115B are indicated in FIG. 1A by the cross-hatch fill in the reactors 110A and 110B. The solids 115A and 115B are described in more detail in sections following below. Referring back to FIG. 1A, both packed bed reactors 110A and 110B are configured to receive a $CO_2$ rich stream 120 or an $H_2$ stream 130, depending on whether a particular packed bed reactor is either capturing $CO_2$ or converting $CO_2$. FIG. 1A illustrates a configuration that enables the continuous operation of the system 100A in that the first packed bed reactor 110A is configured to receive the $CO_2$ rich stream 120 and, as a result, is capturing/removing $CO_2$ from the $CO_2$ rich stream, resulting an a $CO_2$ lean stream 125 exiting this first packed bed reactor 125. While the first reactor 110A is configured to remove $CO_2$ from the $CO_2$ rich stream, the second reactor 110B, having already removed $CO_2$ from the $CO_2$ rich stream 120, is configured to convert the $CO_2$ captured by the solid 115 to the desired target products, contained in a product stream 135, which is accomplished by directing the $H_2$ stream 130 to the second reactor 110B.

Referring again to FIG. 1A, the flow of the $CO_2$ rich stream 120 through the first packed bed reactor 110A, resulting in $CO_2$ being captured by the solid 115A contained in the first packed bed reactor 110A and a $CO_2$ lean stream 125 is indicated by the solid stream lines. The flow of an H2 stream 130 through the second packed bed reactor 110B, resulting in the reacting of the $CO_2$ captured by the solid 115B contained in the second packed bed reactor 110B, resulting the formation of a product stream 135 containing at least one of methanol, CO, and/or methane is indicated by the dashed stream lines. Further, the flow of a $CO_2$ rich stream 120 or an $H_2$ stream 130 may be regulated by the used of controllable 2-way valves (shown in FIG. 1A) and the pressure contained in the reactors 110A and 110B may be independently controlled through the use of back-pressure regulators (shown in FIG. 1A).

Referring again to FIG. 1A, the exemplary system 110A illustrated shows two packed bed reactors 110A and 110B. However, this is not intended to be limiting and other systems 110 may include two or more reactors 110. For example, a system 100 may include one or more reactors 110 configured to essentially simultaneously receive $CO_2$ contained in a feed stream, while the system 100 also contains one or more reactors 110 configured to receive $H_2$ to convert captured $CO_2$ to products. In other words, a system 100 may include a first group of packed bed reactors, where each packed bed reactor 110 is operating in a first mode of operation, receiving one or more $CO_2$ rich streams 120 to capture/remove $CO_2$ from a $CO_2$ rich stream(s) 120, while simultaneously a second group of packed bed reactors 110 is operating in a second mode of operation, receiving one or more $H_2$ streams 130 to remove/convert captured $CO_2$ to desirable target products (e.g., methanol, CO, and/or methane). Thus, a first group of reactors 110, two or more, may all be configured to run in parallel, receiving a $CO_2$ stream, while a second group of reactors, two or more, may all be configured to run in parallel, receiving an $H_2$ stream.

Of course, other configurations are also possible and are within the scope of the present disclosure. For example, two or more reactors 110 configured to either remove $CO_2$ from a stream or configured to receive an $H_2$ stream may be positioned in parallel or in series or some combination thereof.

Figure 1B:
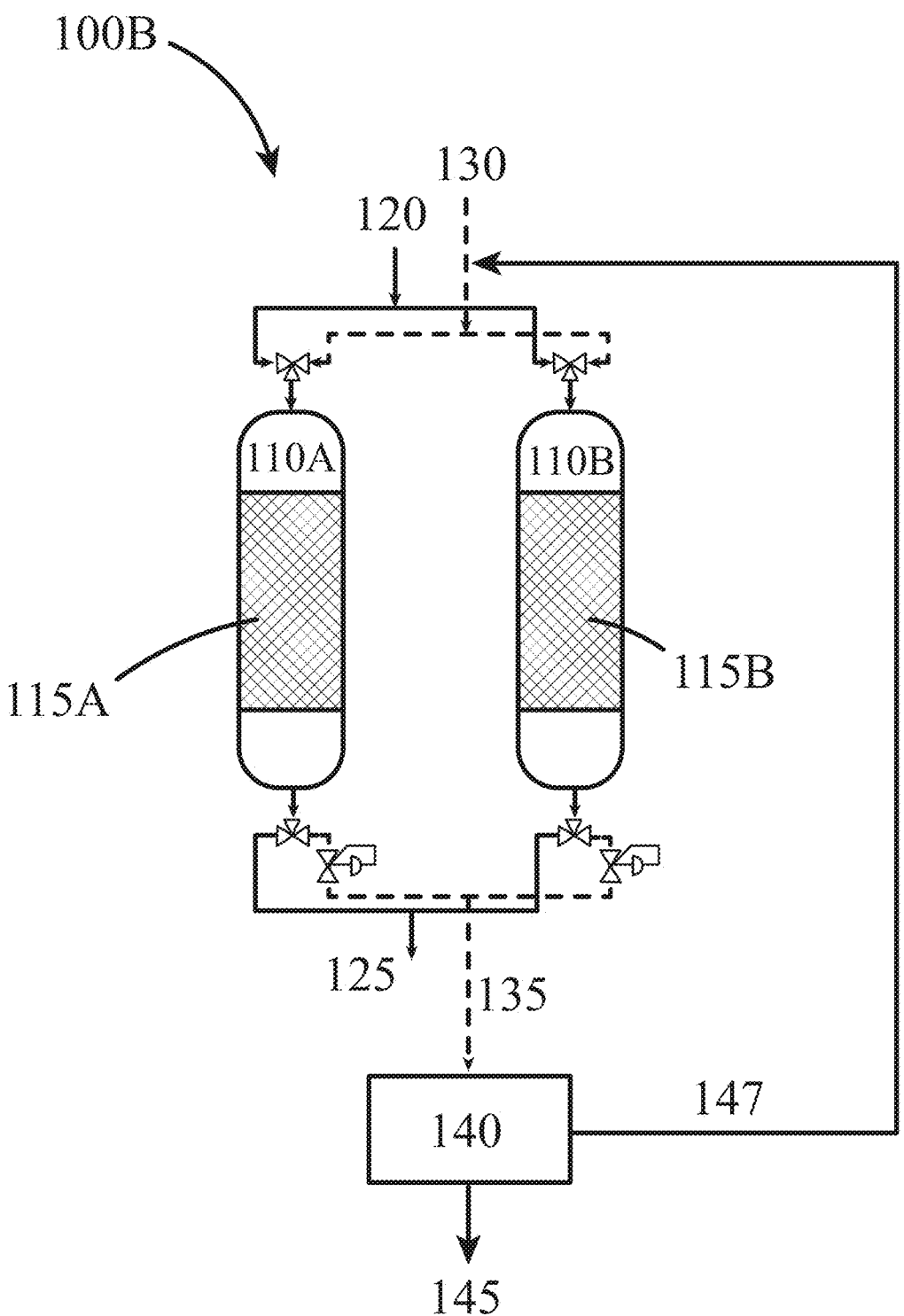

FIG. 1B illustrates a system 100B slightly modified from the system 100A illustrated in FIG. 1A, according to some embodiments of the present disclosure. This system 100B includes an additional unit operation, a separator 140, configured to receive a product stream 125 produced by a reactor 115B configured to convert captured $CO_2$ to target products and separate the product stream 125 into a second product stream 145 and a recycle stream 147 that is directed back to the reactor 115B converting $CO_2$ to target products. For example, in some embodiments of the present disclosure, a product stream 125 may include methanol and at least one of unreacted $H_2$, CO, and/or methane. In some cases, methanol may be the most valuable and/or desirable product, so a separator 140 may be provided to selectively remove methanol from the compounds present in the product stream to produce a new product stream 145 containing essentially pure methanol and a recycle stream 147 containing at least one of unreacted $H_2$, CO, and/or methane, which may then be directed back to the inlet of the reactor 115B operating in a $CO_2$ converting mode. Recycling these compounds may, among other things, increase the conversion of $H_2$ and/or increase the yield of methanol by reacting less desirable CO and/or methane to more desirable methanol. In some embodiments of the present disclosure, methanol may be separated from other components of the stream using unit operations such as condensation, distillation, and/or membrane separation.

Figure 1C:
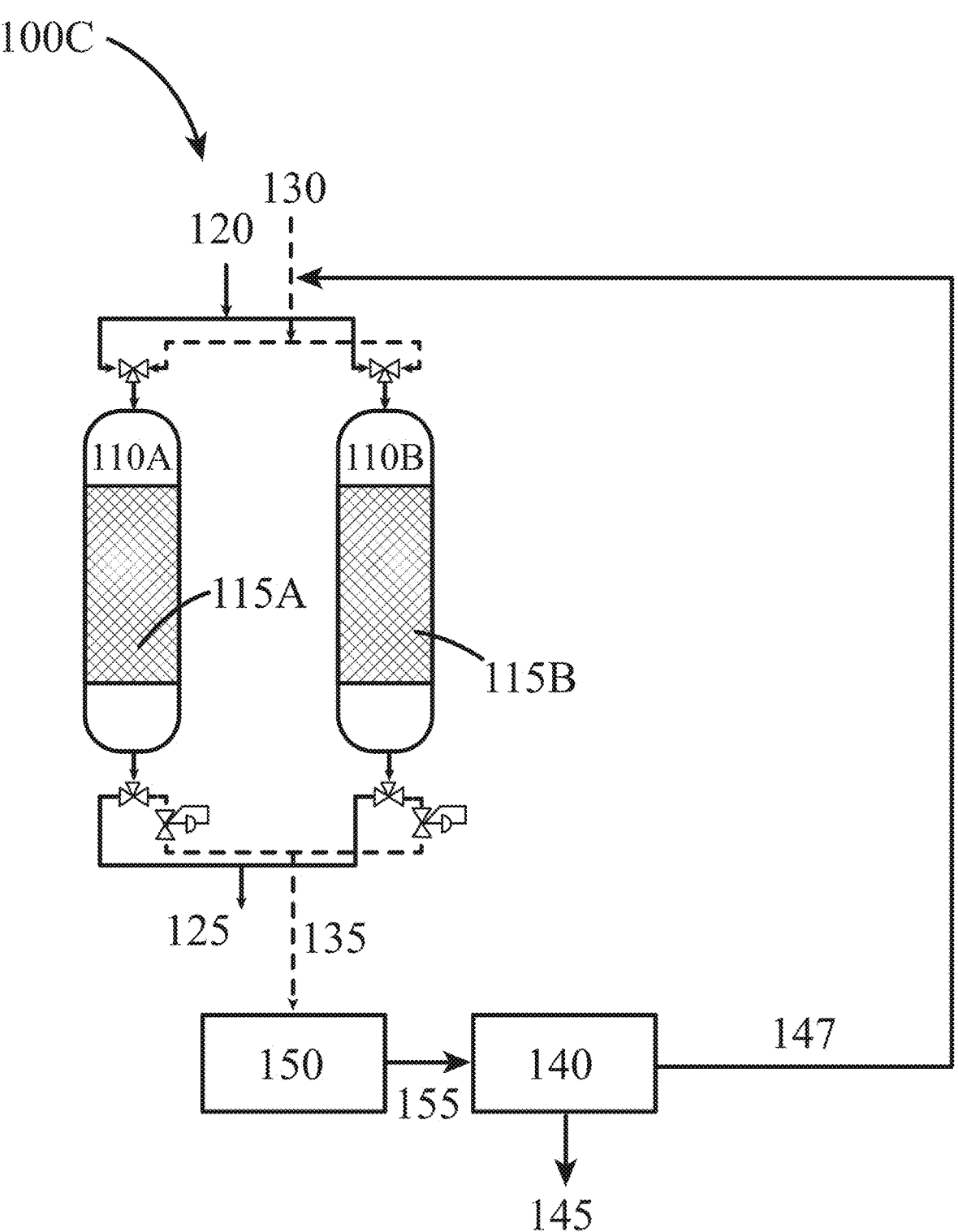

FIG. 1C illustrates a system 100C slightly modified from the system 100B illustrated in FIG. 1B, according to some embodiments of the present disclosure. This system 100C includes an additional unit operation, a reactor 150 configured to receive a product stream 125 from a packed bed reactor 115B operating in a $CO_2$ converting mode and may further convert the less desirable products contained in the product stream 125, such as CO and/or methane to methanol, resulting in the formation of a new product stream 155, rich in methanol. Referring again to FIG. 1C, such a methanol-rich product stream 155 may then be directed to a separator 140 as previously described for FIG. 1B, resulting in the formation of a product stream 145 containing essentially pure methanol and a recycle stream 147 containing at least one of $H_2$, CO and/or methane, which may be redirected to the front-end of the system 100C. This exemplary system 100C, like the system 100B illustrated in FIG. 1B, may provide several benefits, including at least one of maximizing the usage of $H_2$, maximizing the yield of methanol, and maximizing the conversion of CO and/or methane to methanol. Referring again to FIGS. 1A-1C, in some embodiments of the present disclosure, any of the streams illustrated may contain water. Thus, a reactor 150 and/or separator 140 may be configured to selectively react and/or remove water. In some embodiments of the present disclosure, unit operations to convert CO and/or methane to methanol may include additional fixed bed reactors, such as those employed for commercial methanol synthesis from CO and hydrogen and/or those for partial oxidation of methane to methanol. Additional unit operations for synthesizing methanol may include electrochemical devices to convert CO and/or methane to methanol either by reductive or oxidative electrochemistry.

Figure 2:
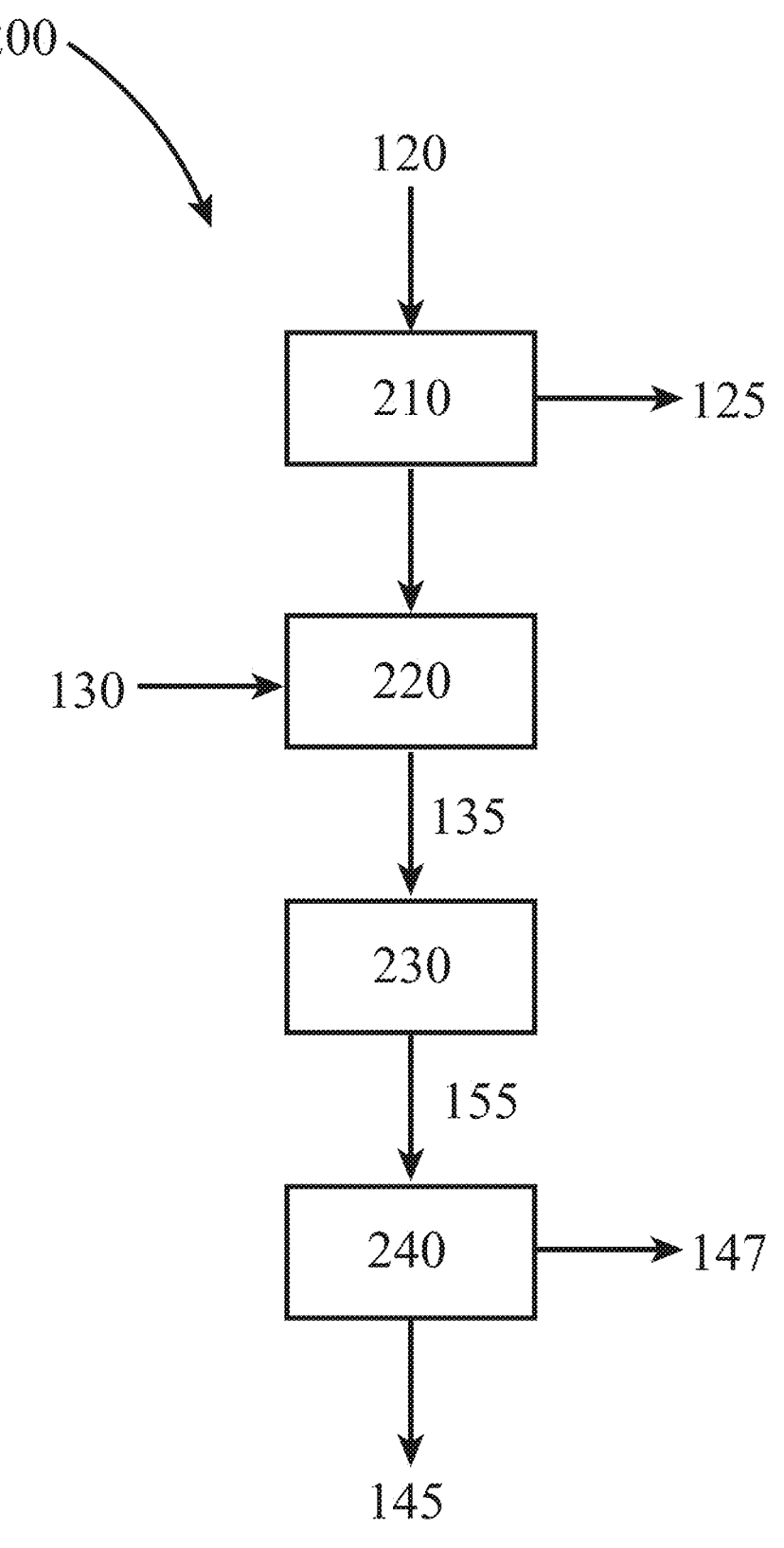
FIG. 2 illustrates a method for capturing and converting $CO_2$ to products such as methanol, CO, and/or methane, according to some embodiments of the present disclosure.

With systems 100A-100C described for capturing $CO_2$ and converting the captured $CO_2$ do desirable products, FIG. 2 illustrates a method 200 for accomplishing both capturing and converting of $CO_2$, according to some embodiments of the present disclosure. This exemplary method 200 highlights four steps already illustrated in FIGS. 1A-1C and described above. The method 200 begins with a first contacting of a solid 115 (not shown in FIG. 2) with a $CO_2$ rich stream 120, such that the solid removes at least a portion of the $CO_2$ contained in the $CO_2$ rich stream 120, resulting in the forming of a $CO_2$ lean stream 125. The removing of the $CO_2$ by a solid 115 may be achieved by at least two mechanisms. The first mechanism is chemisorption characterized by the reaction of $CO_2$ with a surface of the solid 115, such that the reacted $CO_2$ is chemically bonded to the surface of the solid 115. Chemisorption of $CO_2$ may be limited to a single monolayer of $CO_2$ onto the surfaces of the solid. The second mechanism is physisorption, characterized by the adsorption of $CO_2$, due to for example, weaker electrostatic interactions between solid surfaces and the $CO_2$. Physisorption may enable more the capture of more than a single monolayer of $CO_2$ onto the solid 115 surfaces. Without wishing to be bound by theory, and as described in more detail below, in some embodiments of the present disclosure, conversion of $CO_2$ to target compounds may be limited to chemisorbed $CO_2$.

Referring again to FIG. 2, in some embodiments of the present disclosure, a first contacting 210 of a solid 115A with a $CO_2$ rich stream 120 may be performed at a first temperature between 0° C. and 450° C. or between 50° C. and 150° or between 300° C. and 350° C. and a first pressure between 0.8 bar and 30 bar (absolute) or below 2 bar (absolute) or at the local atmospheric pressure. In some embodiments of the present disclosure, a second contacting 220 of a solid 115B with an $H_2$ stream 130 may be performed at a second temperature between 50° C. and 450° C. or between 300° C. and 450° C. or between 300° C. and 350° C. and a second pressure between 0.8 bar and 30 bar (absolute) or below 2 bar (absolute) or at the local atmospheric pressure.

Referring again to FIG. 2, in some embodiments of the present disclosure, a $CO_2$ rich stream 120 may be a flue gas from a manufacturing plant, a power plant, an ethanol production plant, a petroleum refinery, a biorefinery refinery, an aerobic digester, a landfill, from ambient air, or from direct air capture facilities. In some embodiments of the present disclosure, a $CO_2$ rich stream 120 may have a molar concentration of $CO_2$ between 0.04 mol % (i.e., the approximate concentration of $CO_2$ in air) and 100 mol % $CO_2$ or between 0.04 mol % and 1 mol %. In some embodiments of the present disclosure, a system or method may provide an $H_2$ stream 130 and a $CO_2$ rich stream 120 to one or more reactors 115 such that, as averaged over time, $H_2$ is provided relative to the $CO_2$ provided, as defined by a molar ratio of $H_2$ to $CO_2$ ($H_2$:$CO_2$) between 1:1 and 10:1 or 1:1 between and 4:1.

In some embodiments of the present disclosure, at least one of a first contacting 210, a second contacting 220, a reacting 230, and/or a separating may be performed in the presence of oxygen or in the absence of oxygen. In some embodiments of the present disclosure, at least one of a first contacting 210 and/or a second contacting 220 may be performed in the presence of oxygen or in the absence of oxygen. In some embodiments of the present disclosure, a first contacting 210 may be performed in the presence of oxygen or in the absence of oxygen. In some embodiments of the present disclosure, a second contacting 220 may be performed in the presence of oxygen or in the absence of oxygen.

The present disclosure describes two categories of compositions, e.g. solids 115, designed to capture $CO_2$ and convert the captured $CO_2$ to useful compounds such as at least one of methanol, CO, and/or methane. A first composition is based on an oxide that includes zinc and aluminum, referred to herein as ZA compositions, solids, and/or catalysts. A second composition is based on an oxide that includes copper, zinc, and aluminum, referred to herein as CZA compositions, solids, and/or catalysts. Both types of solids 115 are described in more detail below.

ZA solids 115 are based on a first oxide that includes zinc and aluminum. Further, ZA solids 115 include a metal that includes at least one of an alkali metal and/or an alkaline earth metal. In addition, ZA solids may be characterized by a first total uptake capacity of $CO_2$ of greater than 228 μmol $CO_2$/g of solid at a first temperature of about 40° C. and a second total uptake capacity of $CO_2$ of greater than 106 μmol $CO_2$/g of solid at a second temperature of about 300° C. Further, as shown herein, ZA solids are capable of converting $CO_2$ to at least one of CO, methane, or methanol, when exposed to $H_2$ at a third temperature that is greater than the first temperature. In some embodiments of the present disclosure, the first uptake capacity of a ZA solid may be between 228 μmol $CO_2$/g of solid and 398 μmol $CO_2$/g of solid. In some embodiments of the present disclosure, the second uptake capacity of a ZA solid may be between 106 μmol $CO_2$/g of solid and 250 μmol $CO_2$/g of solid. In some embodiments of the present disclosure, the zinc and the aluminum of a ZA solid may be present at a ratio of Zn:Al between 2:4:1 and 1:2.4 on a weight basis. In some embodiments of the present disclosure, a first oxide of a ZA solid may include ZnO and $ZnAl_2O_4$ and a first oxide of a ZA solid may be at least partially in a crystalline phase, including a spinel phase.

In some embodiments of the present disclosure, the metal present in a ZA solid may include at least one of magnesium, calcium, barium, strontium, lithium, sodium, potassium, rubidium, and/or cesium. In some embodiments of the present disclosure, the metal present in a ZA solid may include potassium at a concentration between greater than 0 wt % and less than or equal to 20 wt % or between greater than 0 wt % and less than or equal to 10 wt %. In some embodiments of the present disclosure, the metal present in a ZA solid may include calcium at a concentration between greater than 0 wt % and less than or equal to 20 wt % or between greater than 0 wt % and less than or equal to 10 wt %.

In some embodiments of the present disclosure, the metal present in a ZA solid may be in the form of at least one of a second oxide and/or a cation. In some embodiments of the present disclosure, a second oxide and/or cation may include at least one of $Ca^{2+}$, CaO, $Ca(OH)_2$, $K^+$, KOH, and/or $K_2O$. In some embodiments of the present disclosure, the second oxide may include at least one of amorphous CaO and/or amorphous $Ca(OH)_2$. In some embodiments of the present disclosure, the second oxide may include at least one of amorphous KOH and/or amorphous $K_2O$. In some embodiments of the present disclosure, the second oxide may be dispersed on the surface of the first oxide.

CZA solids 115 are based on a first oxide that includes copper, zinc and aluminum. Further, CZA catalysts include a metal that includes least one of an alkali metal and/or an alkaline earth metal. In addition, CZA solids may be characterized by a first total uptake capacity of $CO_2$ of greater than 218 μmol $CO_2$/g of composition at a first temperature of about 40° C., and a second total uptake capacity of $CO_2$ of greater than 76 μmol $CO_2$/g of composition at a second temperature of about 300° C. Further, as shown herein, CZA solids are capable of converting $CO_2$ to at least one of CO, methane, and/or methanol, when exposed to $H_2$ at a third temperature greater than the first temperature. In some embodiments of the present disclosure, the first uptake capacity of a CZA solid may be between 218 μmol $CO_2$/g of composition and 300 μmol $CO_2$/g of composition. In some embodiments of the present disclosure, the second uptake capacity of a CZA solid may be between 76 μmol $CO_2$/g of composition and 250 μmol $CO_2$/g of composition. In some embodiments of the present disclosure, the first oxide of a CZA solid may include CuO, ZnO, and $Al_2O_3$. In some embodiments of the present disclosure, at least a portion of a first oxide may be in a crystalline phase.

In some embodiments of the present disclosure, a metal of a CZA solid may include at least one of magnesium, calcium, barium, strontium, lithium, sodium, potassium, rubidium, and/or cesium. In some embodiments of the present disclosure, a metal of a CZA solid may be in the form of at least one of a second oxide and/or a cation. In some embodiments of the present disclosure, a second oxide of a CZA solid may be present at a concentration between 1 wt % and 10 wt %, inclusively. In some embodiments of the present disclosure, a second oxide or cation of a CZA solid may include at least one of $Ca^{2+}$, CaO, $Ca(OH)_2$, $Na^+$, NaOH, $Na_2O$, $K^+$, KOH, and/or $K_2O$. In some embodiments of the present disclosure, a second oxide of a CZA solid may be amorphous and include at least one of CaO, $Ca(OH)_2$, NaOH, $Na_2O$, KOH, and/or $K_2O$. In some embodiments of the present disclosure, a second oxide of a CZA solid may be dispersed on the surface of the first oxide.

Experimental

Synthesis of $ZnAlO_x$ (ZA) catalysts: Zinc aluminate ($ZnAlO_x$) catalysts were synthesized through the coprecipitation of zinc and aluminum nitrate salts. Two aqueous solutions were made, a solution of $Zn(NO_3)_2 \cdot 6H_2O$ and $Al(NO_3)_3 \cdot 9H_2O$ with varying nitrate salt concentration to achieve various Zn:Al loadings, and a separate solution of $(NH_4)_2CO_3$. These solutions were stirred to facilitate dissolution of the nitrate salts and loaded into separate syringe pumps. The solutions were pumped into a round bottom flask heated to 70° C. under continuous stirring. The solution was then adjusted to a pH of 7.0 with a $NH_4OH$ solution and left under continuous stirring for three hours. After the 3-hour aging step, the resulting precipitate was filtered and washed at least six times with deionized water to remove residual ions. The washed filter cake was then dried in air at 100° C., prior to calcination at 500° C. in air. The resulting catalysts with varying Zn:Al ratios are delineated herein as zinc-rich (ZA-Z), equal wt % (ZA), and aluminum-rich (ZA-A), with target Zn:Al wt % ratios of 2.4:1, 1:1, and 1:2.4, respectively.

Base modification of $ZnAlO_x$ (ZA) catalysts: $ZnAlO_x$ DFMs were prepared by the addition of alkali and alkaline metals (Alk) using incipient wetness impregnation. K was selected as a representative dopant due to its superior $CO_2$ capture and conversion promotion when compared to other dopants. A target K wt. % loading of 5% was chosen to be consistent with broader DFM literature. An aqueous solution of $K_2CO_3$ was used for impregnation onto the $ZnAlO_x$ powders. The K-doped $ZnAlO_x$ DFMs were dried at 120° C. overnight (>12 h) in static air, prior to calcination at 500° C. in air to decompose the carbonate precursor.

Base modification of $Cu-ZnO-Al_2O_3$(CZA) catalysts: Compositions based on $Cu-ZnO-Al_2O_3$(CZA) were prepared by incipient wetness impregnation method. Aqueous solutions of $Na_2CO_3$, $K_2CO_3$, $Ca(NO_3)_2$, $Sr(NO_3)_2$, and $Ba(NO_3)_2$ precursors were impregnated, respectively, on a commercial CZA catalyst (Clariant Megamax 800). The base-modified CZA (5 wt % $AlkO_x$/CZA, where $AlkO_x$=$Na_2O$, $K_2O$, CaO, SrO or BaO respectively) compositions were dried at 120° C. overnight in static air. Prior to catalytic evaluation, each catalyst was reduced in the reactor at 250° C. for a period of time between 2 hours and 8 hours in a 100% $H_2$ atmosphere with a total flowrate of 100 sccm to decompose the carbonate or nitrate precursors to their respective oxide or ionic species and activate the CZA. An additional set of base-modified CZAs ($AlkO_x$/CZA, with $AlkO_x$=$Na_2O$ and $K_2O$) were synthesized with $AlkO_x$ loading between 1 wt % and 10 wt % following the same incipient wetness impregnation procedure.

Figure 3A:
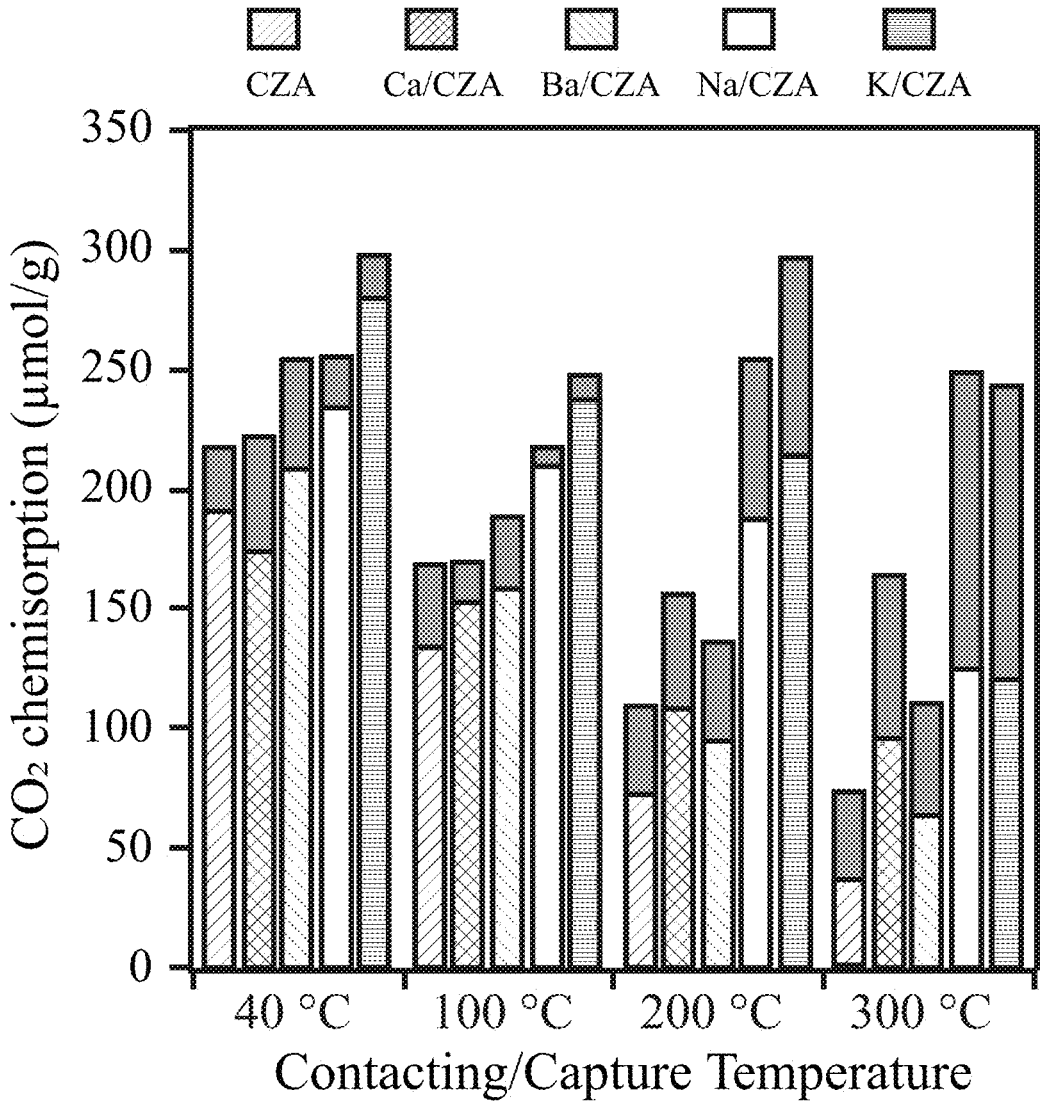
FIG. 3A illustrates total $CO_2$ capture and $CO_2$ chemisorption values for unmodified and base-modified CZA solid compositions, according to some embodiments of the present disclosure.

Powder X-Ray Diffraction (XRD) of unmodified and modified catalysts: XRD patterns of unmodified and base-modified catalysts were collected using a Rigaku Ultima IV diffractometer with a Cu Kα source. Diffractograms were collected in the 20 range of 20-70° at a scan rate of 2°/min. XRD patterns were collected after catalyst synthesis and drying. $CO_2$ capture on unmodified and base-modified $Cu-ZnO-Al_2O_3$(CZA) and $ZnAlO_x$ (ZA) catalysts: $CO_2$ capture (chemisorption and/or physisorption) measurements were performed over a variety of temperatures to probe the effects of base modification and $CO_2$/solids contacting temperatures on $CO_2$ capture capacity of M/CZA solid compositions. As seen in FIG. 3A and Table 1, the total and $CO_2$ chemisorption for CZA solid compositions decreased as the $CO_2$/solids contacting temperature increased, decreasing from 218 mmol/g to 76 mmol/g when the temperature was increased from 40° C. to 300° C. Addition of Ca resulted in temperature-dependent changes in $CO_2$ capture. At low temperatures (e.g., 40° C.), modifying CZA solids with Ca did not appear to affect $CO_2$ chemisorption. At moderate temperatures (100° C.), the overall capacity appeared constant, but chemisorption increased. At high contacting temperatures (e.g., between 200° C. and 300° C.), chemisorption and total $CO_2$ capture capacity increased on Ca/CZA solids (109, 97 mmol/g) when compared to unmodified CZA solids (74, 37 mmol/g). Ba/CZA solids exhibited similar $CO_2$ capture behavior with increasing $CO_2$/solids contacting temperature as Ca/CZA solids. K and Na modification to the solids compositions increased chemisorbed and total $CO_2$ capture capacity at all temperatures when compared to both Ca/CZA solids and unmodified CZA solids. These data suggest that base site identity can be used to tune $CO_2$ chemisorption characteristics, an important component for solid compositions designed to both capture and convert $CO_2$.

Figure 4A:
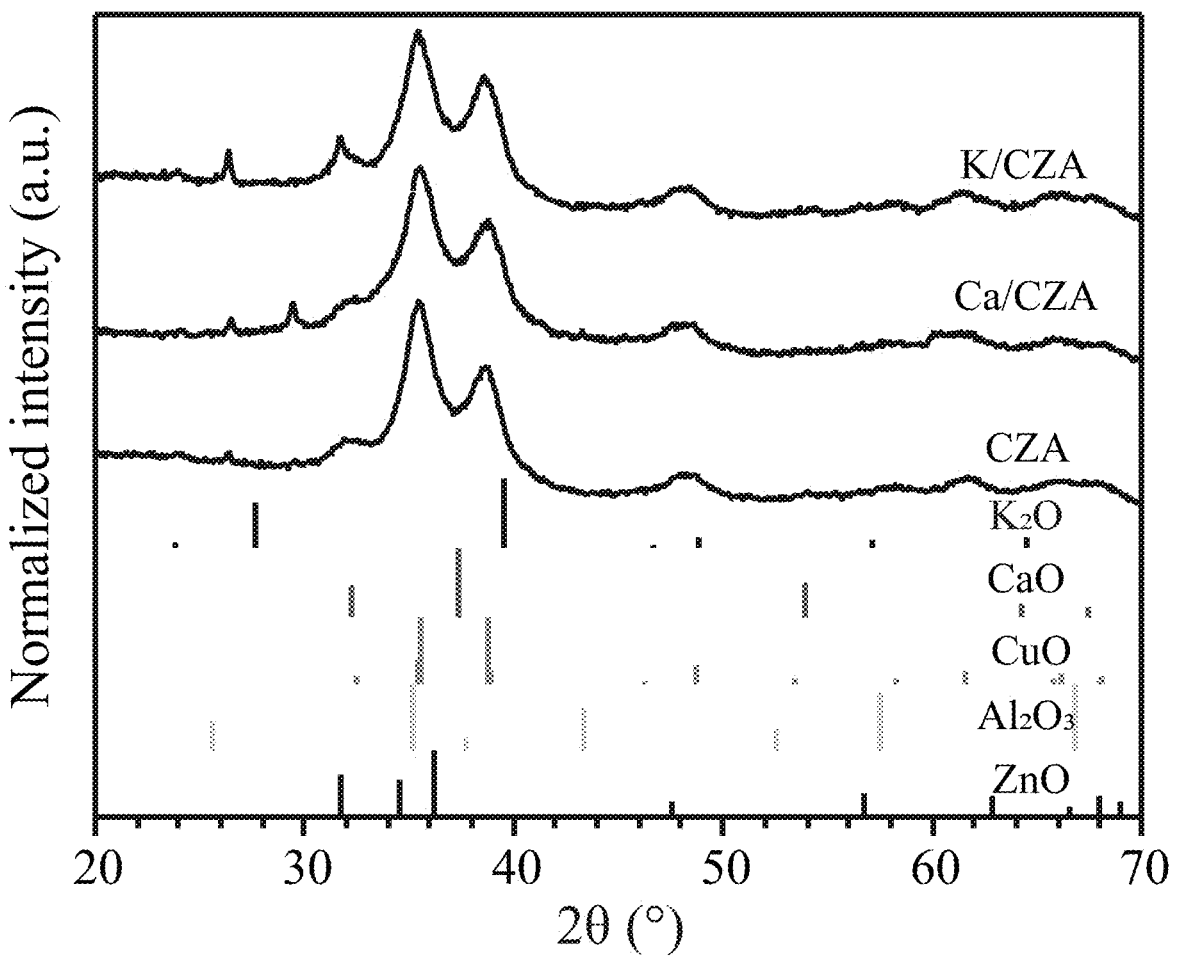
FIG. 4A illustrates XRD patterns for post synthesis unmodified and base-modified CZA solid compositions, according to some embodiments of the present disclosure. Standard XRD PDF patterns for the possible components within the unmodified and base-modified solids are inset in their respective figures.

X-Ray Diffraction of unmodified and base-modified $Cu-ZnO-Al_2O_3$(CZA) and $ZnAlO_x$ (ZA) solid compositions: XRD characterization of the unmodified CZA solid compositions (Clariant Megamax 800) and base-modified CZA solid compositions (see FIG. 4A) was performed to identify crystalline phases. The unmodified CZA solid contained relatively low-intensity reflections at approximately 32 and 490 and relatively high-intensity reflections at approximately 350 and 39°, corresponding to a combination of the expected ZnO, $Al_2O_3$ and CuO phases. XRD patterns of the base-modified (Ca or K)/CZA solids remained relatively unchanged when compared to the unmodified CZA solids. The absence of crystalline CaO or $K_2O$ species peaks suggests that the basic metal species were amorphous and dispersed throughout the surface of the CZA solids without perturbing its structure.

Figure 4B:
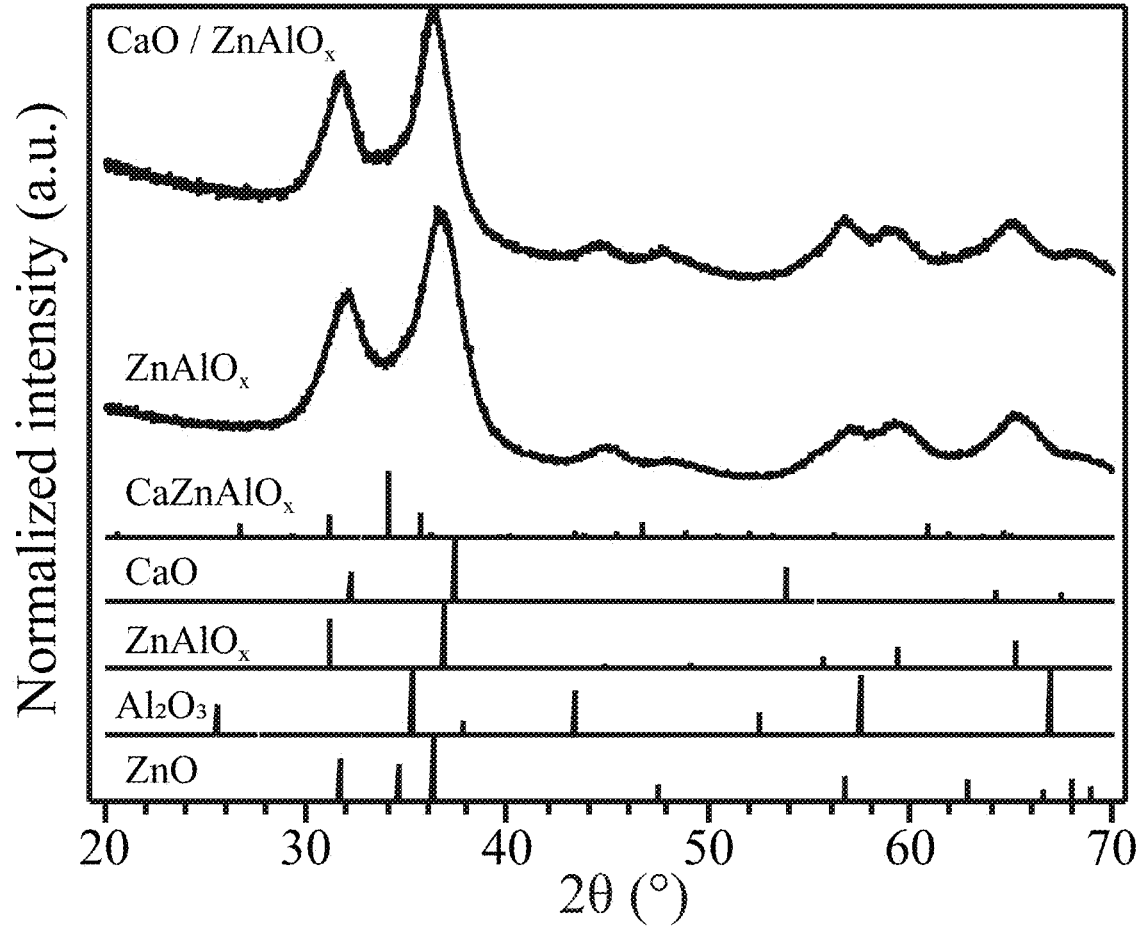
FIG. 4B illustrates XRD patterns for post synthesis unmodified and base-modified ZA solid compositions, according to some embodiments of the present disclosure. Standard XRD PDF patterns for the possible components within the unmodified and base-modified solids are inset in their respective figures.

XRD characterization of the unmodified ZA solids (see FIG. 4B) identified two high-intensity reflections at approximately 320 and 37°, indicative of ZnO and $ZnAl_2O_4$ spinel phases. Reflections for a separate $Al_2O_3$ phase were absent. XRD characterization of Ca/ZA solids indicated that base-modification did not alter the parent ZA solid structure (i.e., reflections corresponding to CaO and $CaZnAlO_x$ were absent). The Ca species have not formed large crystalline CaO phases and have not become incorporated into the ZnO or $ZnAl_2O_4$ lattices, rather, the Ca species appear to be dispersed in an amorphous fashion on the surface of the ZA solids.

TABLE 1

$CO_2$ capture values for unmodified and base-modified CZA solids as a function of $CO_2$ contact/capture temperature.

| $CO_2$/Solid Contact Temperature (° C.) | Material Name | Total Captured $CO_2$ (μmol/g) | Chemisorbed $CO_2$ (μmol/g) | Physisorbed $CO_2$ (μmol/g) |
|---|---|---|---|---|
| 40 | CZA | 218 | 192 | 26 |
| | Ca/CZA | 223 | 175 | 48 |

TABLE 1-continued

CO$_2$ capture values for unmodified and base-modified CZA solids
as a function of CO$_2$ contact/capture temperature.

| CO$_2$/Solid Contact Temperature (° C.) | Material Name | Total Captured CO$_2$ (μmol/g) | Chemisorbed CO$_2$ (μmol/g) | Physisorbed CO$_2$ (μmol/g) |
|---|---|---|---|---|
| | Ba/CZA | 255 | 209 | 46 |
| | Na/CZA | 257 | 235 | 22 |
| | K/CZA | 299 | 281 | 18 |
| 100 | CZA | 170 | 135 | 35 |
| | Ca/CZA | 171 | 154 | 17 |
| | Ba/CZA | 189 | 160 | 29 |
| | Na/CZA | 218 | 211 | 7 |
| | K/CZA | 248 | 238 | 10 |
| 200 | CZA | 111 | 74 | 37 |
| | Ca/CZA | 157 | 109 | 48 |
| | Ba/CZA | 137 | 96 | 41 |
| | Na/CZA | 255 | 188 | 67 |
| | K/CZA | 297 | 215 | 82 |
| 300 | CZA | 76 | 37 | 39 |
| | Ca/CZA | 165 | 97 | 68 |
| | Ba/CZA | 112 | 65 | 47 |
| | Na/CZA | 250 | 126 | 124 |
| | K/CZA | 244 | 122 | 122 |

TABLE 2

CO$_2$ chemisorption values for unmodified and Ca-modified ZA solids
as a function of CO$_2$ contact/capture temperature.

| CO$_2$/Solid Contact Temperature (° C.) | Material | Total Captured CO$_2$ (μmol/g) | Chemisorbed CO$_2$ (μmol/g) | Physisorbed CO$_2$ (μmol/g) |
|---|---|---|---|---|
| 40 | ZA | 228 | 114 | 114 |
| | Ca/ZA | 398 | 235 | 163 |
| 100 | ZA | 207 | 123 | 84 |
| | Ca/ZA | 323 | 236 | 87 |
| 200 | ZA | 158 | 59 | 99 |
| | Ca/ZA | 251 | 144 | 107 |
| 300 | ZA | 106 | 6 | 100 |
| | Ca/ZA | 224 | 94 | 130 |

CO$_2$ chemisorption measurements were performed over a variety of contact/capture temperatures to probe the effects of base modification on CO$_2$ capture capacity. Total chemisorbed CO$_2$ represents both chemisorbed and physisorbed CO$_2$. After measuring the total captured CO$_2$, the instrument evacuates the sample cell at the analysis temperature, leaving CO$_2$ species that are chemically adsorbed at that temperature. The weak physically adsorbed CO$_2$ is then measured, and the strong chemisorbed CO$_2$ value is determined by difference of total and physisorbed capacities.

As seen in FIG. 3A and Table 1, the total and strong CO$_2$ chemisorption values for CZA solids decreased as the contacting temperature increased, decreasing from 218 to 76 mmol/g when the contacting temperature was increased from 40 to 300° C. Addition of Ca to the solid compositions resulted in temperature-dependent changes in CO$_2$ chemisorption. At low temperatures (e.g., about 40° C.), modifying CZA solids with Ca did not appear to affect CO$_2$ chemisorption. At moderate temperatures (e.g., about 100° C.), the overall total capacity appeared constant, but the contribution due to chemisorption increased compared to unmodified CZA. At high contacting temperatures (between about 200° C. and about 300° C.), the chemisorbed and total CO$_2$ capture values increased for modified Ca/CZA solids (109, 97 mmol/g) when compared to unmodified CZA solids (74, 37 mmol/g). Ba/CZA modified solids exhibited similar CO$_2$ chemisorption behavior with increasing temperature as Ca/CZA. K and Na modification increased strong and total CO$_2$ chemisorption values at all temperatures when compared to both Ca/CZA solids and unmodified CZA solids. These data suggest that base site identity can be used to tune CO$_2$ chemisorption characteristics, an important component for solids designed to both capture and convert CO$_2$. Specifically, the alkali metals (Na, K) exhibited greater total and chemisorption capacity than the alkaline earth metals (Ca, Ba) at higher contact temperatures that are relevant for CO$_2$ conversion.

Figure 3B:
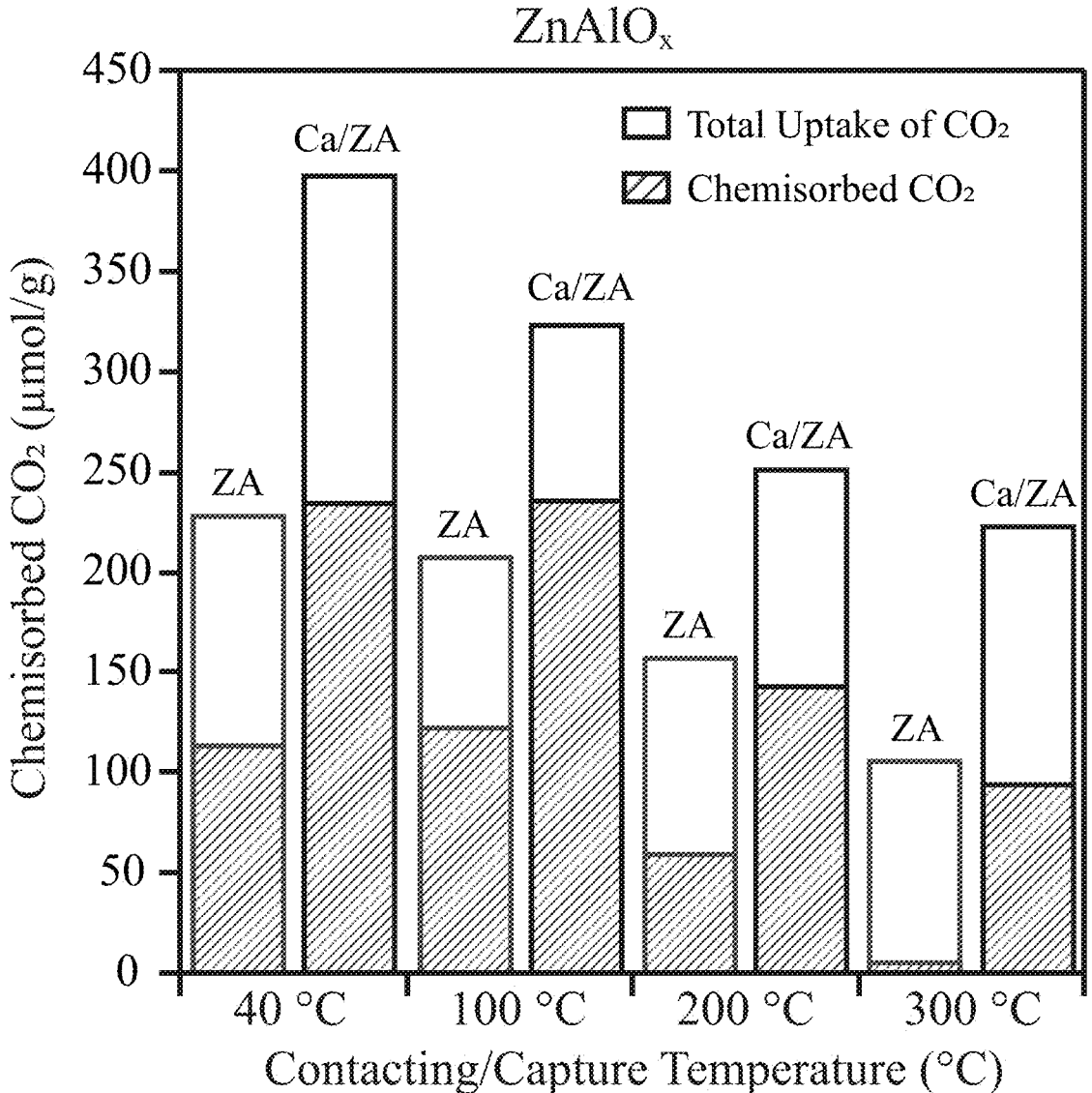
FIG. 3B illustrates total and $CO_2$ capture and $CO_2$ chemisorption values for unmodified and base-modified ZA solid compositions, according to some embodiments of the present disclosure.

FIG. 3B summarizes the CO$_2$ capture for unmodified ZA solids and Ca-modified ZA (CA/ZA) solids as an example of base-modified ZA solid compositions. Similar to CZA solids and modified-CZA solids, the total CO$_2$ capture decreased as the contacting/capture temperature increased for both ZA solids. Interestingly, for both ZA solids and Ca/ZA solids, the chemisorbed CO$_2$ values were comparable at 40° C. and 100° C. capture temperatures, but then decreased with increasing contacting/capture temperature. Total and chemisorbed CO$_2$ capture capacities was significantly greater after base site modification to the solids (Ca/ZA) across all contact/capture temperatures compared to the parent ZA solid. Taken together, these datas indicate that base-modification of solid compositions with a variety of alkali/alkaline species can increase CO$_2$ capture capacities on solid compositions designed to both capture and convert $_{CO2}$, particularly at higher contact/capture temperatures ($\geq$200° C.) that are more relevant for CO$_2$ conversion.

Figure 5:
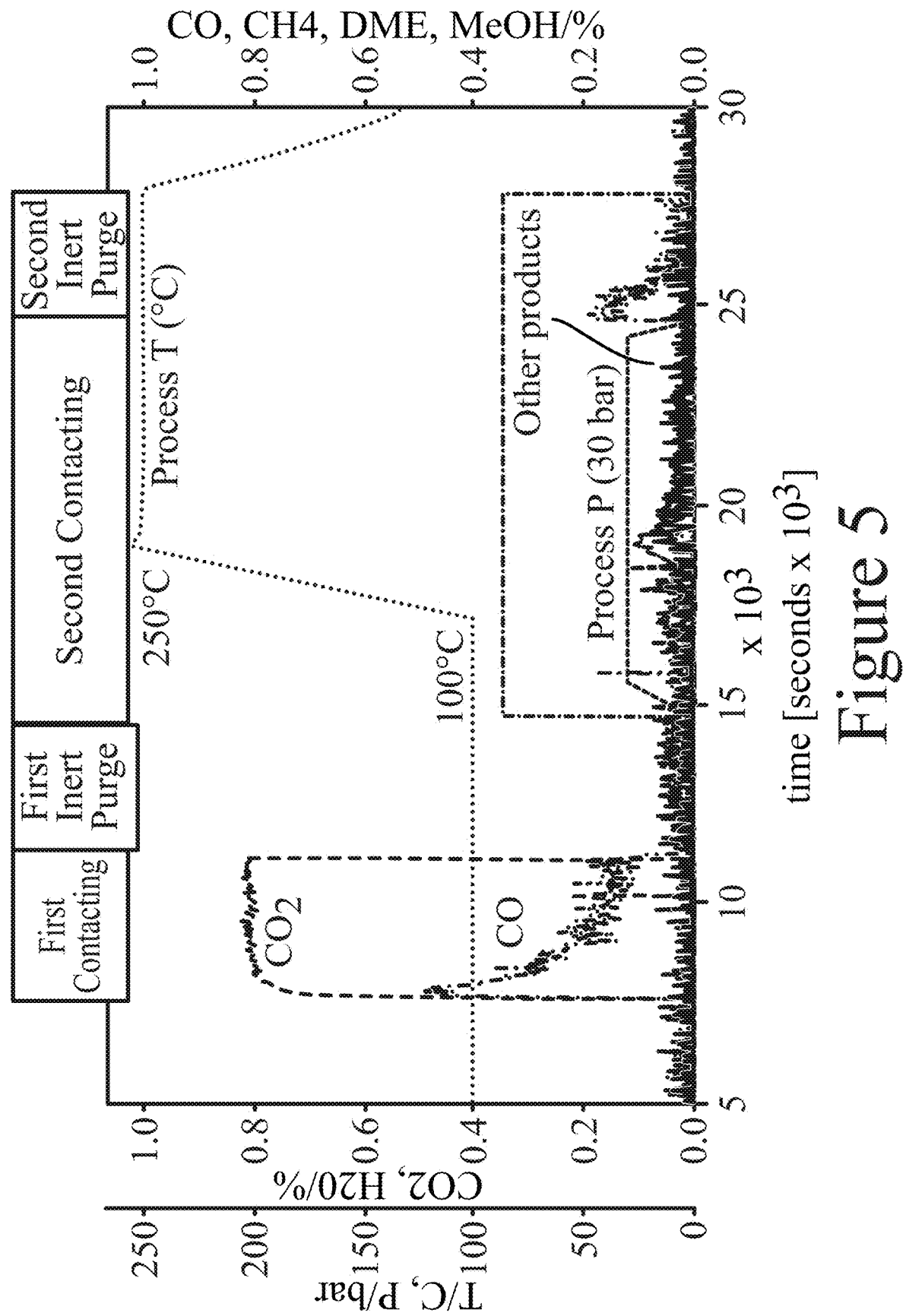
FIG. 5 illustrates an experimental procedure and corresponding product evolution for a $CO_2$ carbon capture/conversion cycle, according to some embodiments of the present disclosure.

Performance of alkali modified CZA solid compositions in reactive carbon capture cycles: A typical experimental procedure and associated product evolution for a reactive carbon capture cycle is shown in FIG. 5. The overall cycle conditions consisted of the following 4 steps:

1. CO$_2$ contacting/capture step: Carbon capture occurs due to the contacting of the solid material with a CO$_2$ stream. 1% CO$_2$/He, 100 sccm total flow rate, 1 h, 0.8 bar, 50-150° C.;

2. First inert purge: 100% He, 100 sccm total flow rate, 1 h, 0.8 bar, 100° C. This step removes physisorbed and gas-phase CO$_2$ from the system at atmospheric pressure before the CO$_2$ conversion step. Additional purge in H$_2$ was also included in one cycle, as noted below.

3. Conversion (or reactive desorption) of CO$_2$: This step converts chemisorbed CO$_2$ to at least one of CO, MeOH, and/or CH$_4$. 100 sccm of pure H$_2$, and the reactor pressure was set to desired setpoint (e.g., 30 bar). When the pressure stabilized at the setpoint, the reactor temperature was increased to a final reaction temperature (between 220° C. and 250° C.) with a ramp rate of 5° C./min, and then held at the final reaction temperature for about 2 hours. Finally, the reactor pressure was decreased to allow any additional reaction to occur at a reduced pressure of about 0.8 bar for about another 1 hour;

4. Second inert purge: 100% He, 100 sccm total flow rate, 1 hour, 0.8 bar. During this step, the reactor was cooled to the desired temperature and any remaining CO$_2$ was released to prepare the reactor for the next CO$_2$ capture step.

In all experiments, 1 g of solid material was loaded into a fixed bed reactor and was pretreated under 100 sccm of 100% H$_2$ at 250° C. for at least 2 hours before cooling down in 100 sccm of He to begin the first cycle of CO$_2$ capture and conversion. In some embodiments of the present disclosure, this step may not be necessary.

Figure 6:
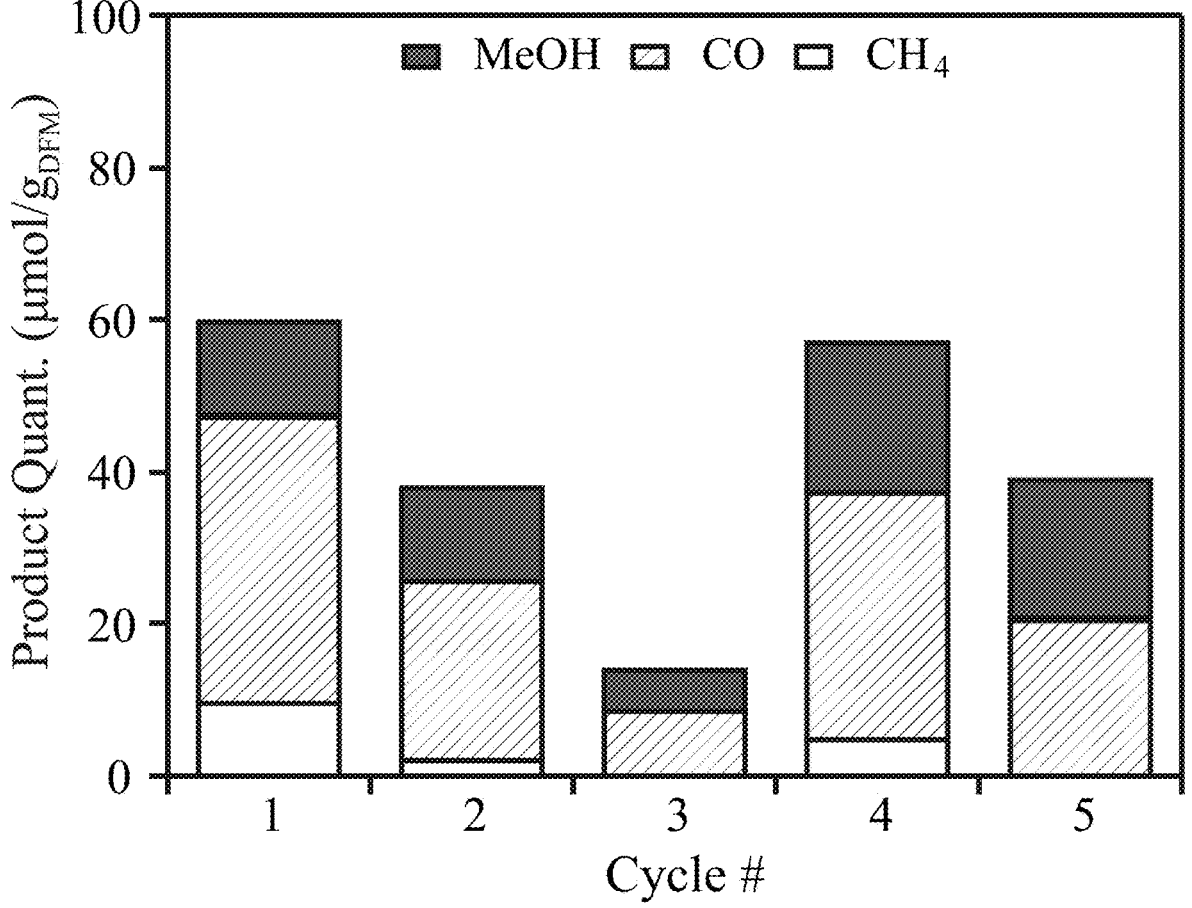
FIG. 6 illustrates productivity ($\mu mol/g_{DFM}$) of products during the hydrogenation step versus cycle number in a $CO_2$ capture/conversion process over a CZA solid composition, according to some embodiments of the present disclosure.

Product yield (presented here with units of mol/g-DFM) and product selectivity during the reactive carbon capture cycles are presented in FIG. 6 and Table 3A, and the detailed experimental conditions tested for every cycle is found in Table 3B for CZA solids. For this baseline experiment with unmodified CZA solids, a variety of temperature and pressure conditions were explored for both $CO_2$ capture and conversion steps to determine optimal process parameters for methanol (MeOH) production. CO, MeOH and $CH_4$ were the main products observed during the reactive conversion step. At the same $CO_2$ capture temperature of 50° C. (cycles #1-3), greater product yield was observed with higher conversion temperatures from 220° C. to 235° C. to 250° C. However, at lower conversion temperatures, $CH_4$ selectivity decreased. Due to having the highest conversion and MeOH productivity, 250° C. was chosen as the highest temperature for the reactive desorption step on CZA based solids for cycling studies. Despite $CO_2$ capture being more thermodynamically favorable at lower temperatures, the quantity of CO and MeOH produced between cycle #1 (50° C. ads) and #4 (100° C. ads) was comparable, with slightly lower $CH_4$ produced in cycle #4. Similarly, $CO_2$ capture at 150° C. (cycle #5) generated comparable CO and MeOH, however, a $CO_2$ capture temperature of 100° C. was chosen for repeated cycling studies. This temperature was selected as the product performance was comparable to contacting at lower temperatures, but it reduced the temperature gradient when switching from contacting to converting. These initial data demonstrate the tunability of conversion and selectivity of the solid based on the chosen process conditions, providing some control over the relative amounts of CO, MeOH, and $CH_4$ produced with a baseline CZA solid material.

TABLE 3A

Product quantification ($\mu$mol/$g_{DFM}$) for baseline CZA during
reactive carbon capture operation. Details on process conditions
used for the cycles are summarized in Table 3B.

| | | Cycle | | | | |
|---|---|---|---|---|---|---|
| | | 1 | 2 | 3 | 4 | 5 |
| CO ($\mu$mol/g-DFM) | CZA | 37.7 | 23.8 | 8.6 | 32.6 | 20.8 |
| MeOH ($\mu$mol/g-DFM) | CZA | 12.6 | 12.6 | 5.5 | 19.9 | 18.4 |
| $CH_4$ ($\mu$mol/g-DFM) | CZA | 9.6 | 1.8 | 0.0 | 4.7 | 0.0 |

TABLE 3B

Process Conditions for data illustrated in FIG. 6.

| Cycle # | Contact T [° C.] | $H_2$ purge | Converting T [° C.] | Converting Ps [bar] |
|---|---|---|---|---|
| 1 | 50 | no | 250 | 30 and 0.8 |
| 2 | 50 | no | 235 | 30 and 0.8 |
| 3 | 50 | yes | 220 | 30 and 0.8 |
| 4 | 100 | no | 250 | 30 and 0.8 |
| 5 | 100 | no | 250 | 30 and 0.8 |

Figure 7:
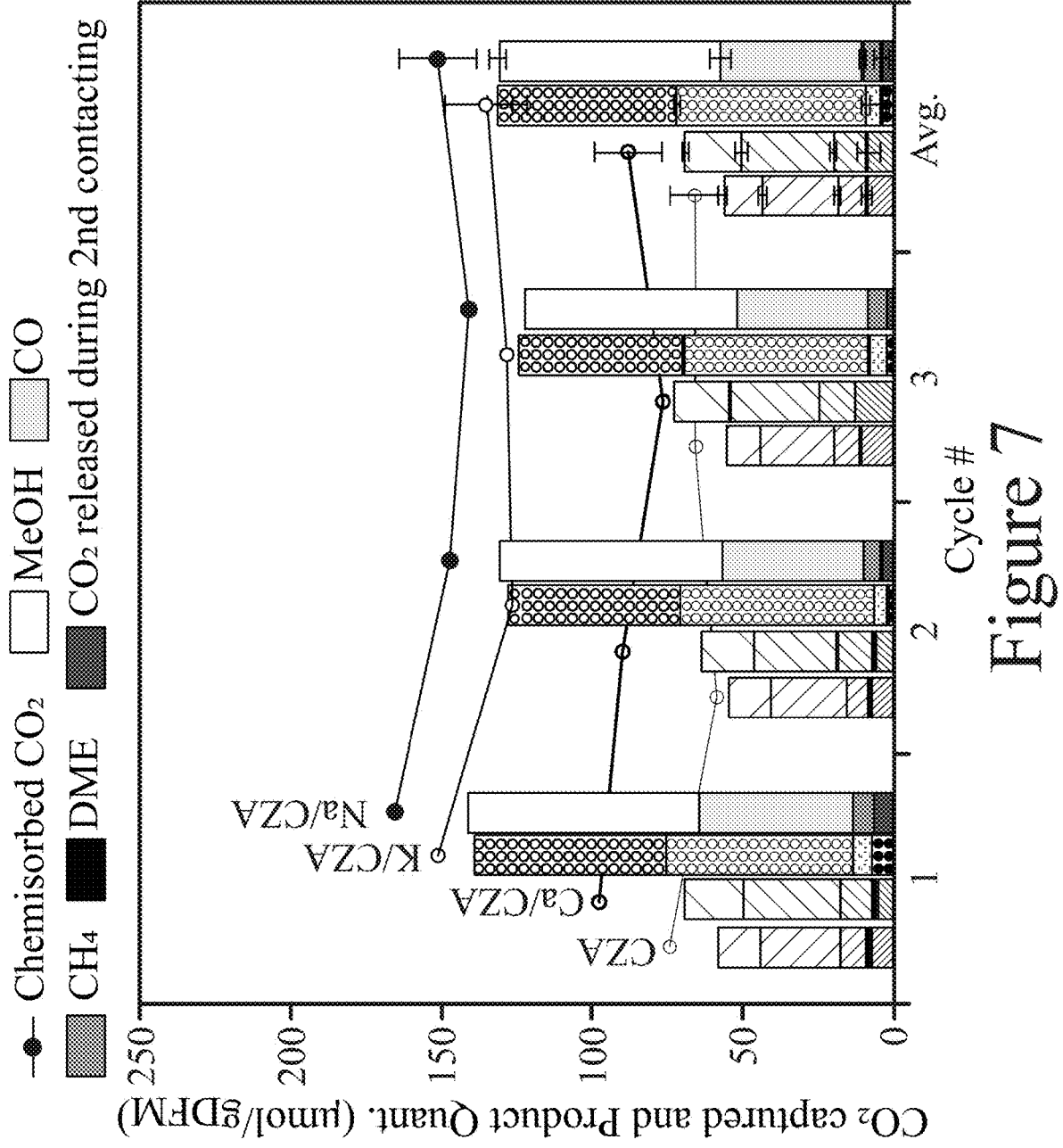

Modified-CZA solids (including Ca/CZA, Ba/CZA, K/CZA and Na/CZA) were tested in multiple cycles of capture and conversion to compare their performance to the parent CZA. For these cycles, $CO_2$ capture was performed at 100° C., followed by an inert purge also at 100° C. and pressurization at 30 bar in hydrogen with a conversion temperature of 250° C. for a 2 hour reaction at 30 bar and followed by 1 hour of reaction at 0.8 bar pressure. Each solid was tested in 5 cycles. Results from the last 3 cycles were averaged and the results are illustrated in FIG. 7 and summarized in Table 4. These solids exhibited stable performance, in terms of $CO_2$ capture, unreacted $CO_2$ desorbed and reaction products evolved during the conversion step.

The introduction of alkali or alkaline increased chemisorbed $CO_2$ capture capacity of the solids in an increasing order of CZA<Ba/CZA≤Ca/CZA<K/CZA≤Na/CZA. Accordingly, K/CZA solids and Na/CZA solids provided the greatest yields to hydrogenated products with an average of 127 $\mu$mol/g and 128 $\mu$mol/g for K/CZA and Na/CZA, respectively. As shown in FIG. 7, the main products observed were CO (left hatched) and MeOH (right hatched). K/CZA and Na/CZA also exhibited the highest selectivity to MeOH with an average of 46%, and 56%, respectively. When combined with their superior $CO_2$ capture capacity, Na/CZA solids yielded the highest MeOH productivity at an average of 74.2 $\mu$mol/g. MeOH selectivity was substantially lower for Ca/CZA (28%), Ba/CZA (29%) and CZA (24%), yielding much less MeOH at 18.9, 21.1, and 13.2 $\mu$mol/g, respectively. In addition, average $CH_4$ selectivity (checkered) remained in single digits for Ba/CZA (2%), K/CZA (4%) and Na/CZA (5%), comparatively low compared to Ca/CZA solids and CZA solids (~16% for each). K/CZA solids also exhibited a carbon balance closer to unity throughout the final 3 cycles (>97%), indicating that the captured $CO_2$ was almost completely converted during the hydrogenation (i.e., second contacting/conversion step), thereby regenerating the solid surface for subsequent cycles. CZA, Ca/CZA and Na/CZA, on the other hand, exhibited comparatively lower carbon balances (≤87%), which may indicate residual buildup of carbon species on their surfaces that may result in decreased capture capacity in later cycles, blocked catalytic sites and eventual deactivation (though catastrophic deactivation was not observed in these few cycles that focused on initial performance). In summary, K/CZA solids and Na/CZA solids demonstrated the most promising performance for producing MeOH, given their high $CO_2$ capture capacity, high MeOH selectivity and per-cycle productivity, low $CH_4$ selectivity, and high carbon balance, leading to superior cyclability relative to the other solids included in this study.

TABLE 4

$CO_2$ capture, C-balance and product yield (mmol/$g_{DFM}$) of all products,
including desorbed $CO_2$ during the reactive conversion step over CZA,
Ba/CZA, Ca/CZA, K/CZA and Na/CZA. $CO_2$ capture was performed
at 100° C. and atm pressure followed by conversion at 250° C.
and 30 bar for 2 hours and additional conversion at 0.8 bar pressure
for 1 hour. Data are the average of the last 3 cycles.

| Metric | Cycle | Avg. |
|---|---|---|
| $CO_2$ adsorption ($\mu$mol/g) | CZA | 66.0 |
| | Ba/CZA | 77.1 |
| | Ca/CZA | 87.8 |
| | K/CZA | 135.2 |
| | Na/CZA | 151.2 |
| CO yield ($\mu$mol/g) | CZA | 25.0 |
| | Ba/CZA | 48.8 |
| | Ca/CZA | 30.2 |
| | K/CZA | 62.6 |
| | Na/CZA | 47.0 |
| MeOH yield ($\mu$mol/g) | CZA | 13.2 |
| | Ba/CZA | 21.1 |
| | Ca/CZA | 18.9 |
| | K/CZA | 59.0 |
| | Na/CZA | 74.2 |
| $CH_4$ yield ($\mu$mol/g) | CZA | 9.1 |
| | Ba/CZA | 2.0 |
| | Ca/CZA | 11.0 |
| | K/CZA | 5.6 |
| | Na/CZA | 6.5 |

TABLE 4-continued

CO₂ capture, C-balance and product yield (mmol/g$_{DFM}$) of all products, including desorbed CO₂ during the reactive conversion step over CZA, Ba/CZA, Ca/CZA, K/CZA and Na/CZA. CO₂ capture was performed at 100° C. and atm pressure followed by conversion at 250° C. and 30 bar for 2 hours and additional conversion at 0.8 bar pressure for 1 hour. Data are the average of the last 3 cycles.

| Metric | Cycle | Avg. |
|---|---|---|
| CO₂ desorption (μmol/g) | CZA | 8.8 |
| | Ba/CZA | 22.7 |
| | Ca/CZA | 7.9 |
| | K/CZA | 3.5 |
| | Na/CZA | 3.6 |
| C-balance | CZA | 86% |
| | Ba/CZA | 126% |
| | Ca/CZA | 80% |
| | K/CZA | 97% |
| | Na/CZA | 87% |

Evaluating performance over 20 cycles of CO₂ capture/conversion: Both K/CZA solids and Na/CZA solids were selected for stability studies in a reactive carbon capture process. The procedure was identical to the previously described cycles and the results for 20 cycles are shown in FIG. 8. Both solids exhibited deactivation during the first 8-10 cycles, indicated by a decrease in both CO₂ chemisorption capacity and product yield, especially for MeOH. Deactivation was more pronounced over K/CZA solids, with MeOH yield decreasing from 86 μmol/g to 36 μmol/g after the first 10 cycles (ca. 60% decrease), whereas Na/CZA solids exhibited only ca. 30% decrease in MeOH yield over the same period (from 87 μmol/g in the 1$^{st}$ cycle to 63 μmol/g in the 10$^{th}$ cycle). After 10 cycles, CO₂ capture/conversion performance was rather stable for both solids with only 8-10% decrease in MeOH yield from the 10$^{th}$ to the 20$^{th}$ cycle. Among the solids studied, the Na/CZA solid stands out due to its stable MeOH production at high selectivity (>56%) throughout 20 cycles (see FIG. 9). Moreover, its selectivity towards less desirable CH₄ remains low (<5%), opening the possibility of a pathway for CO recovery and recycling for increased MeOH yield.

Effect of varying contacting/capture temperature on CO₂ capture/conversion performance of Na/CZA solids: CO₂ capture/conversion performance of 5 wt % Na/CZA solids was evaluated at various contacting/capture temperatures (T$_{ads}$) between 100° C. and 250° C. at 50° C. intervals, with the conversion step (i.e., second contacting step) performed as above at 250° C. and 30 bar. Five cycles were performed at each T$_{ads}$ condition. Average results of the last 3 cycles, including CO₂ capture, product yield and C-selectivity are depicted in FIG. 10. The CO₂ contacting/capture temperature did not dramatically change total CO₂ capture (~150 μmol/g); however, total yield during the conversion step changed slightly, with the isothermal cycles (T$_{ads}$=250° C.) yielding the most products (160 μmol/g) compared to the average productivity at T$_{ads}$ 200° C. (125 μmol/g).

The products made through these CO₂ capture/conversion experiments were CO, MeOH, CH₄, and dimethyl ether (DME). For a contacting/capture temperature (T$_{ads}$) between 100° C. and 250° C., MeOH was made with the highest selectivity (≥60%), but for T$_{ads}$=250° C., MeOH selectivity decreased to 45%, with CO being favored. As a result, although cycles with T$_{ads}$=250° C. gave the highest yield of total products, MeOH yield was the lowest of the four contacting/capture temperatures explored here (see Panel A of FIG. 11). CH₄ yield was suppressed at a contacting/capture temperature of greater than 100° C., however, MeOH yield was more consistent over the first 5 cycles (see Panel B of FIG. 11) at T$_{ads}$=100° C. Considering flue gas as a source for CO₂ for CO₂ capture/conversion technology, 100° C. is a relevant capture temperature, and therefore, this CO₂ contacting temperature was selected as a practical temperature for future studies.

Effect of varying Na loading on CO₂ capture/conversion performance of Na/CZA solids: Based on the 20-cycle testing results, Na was chosen as the most promising alkali adsorbent for subsequent loading studies. Na loadings of 1, 5, and 10 wt % (as Na₂O) on CZA solids were chosen, termed 1-Na/CZA, 5-Na/CZA and 10-Na/CZA, respectively. FIG. 12 illustrates the data from five CO₂ capture/conversion cycles, presenting the average of the last 3 cycles. The experimental methodology and reaction conditions were similar as previously explained, with the CO₂ capture step (i.e., first contacting step) performed at 100° C. and reactive desorption step (i.e., second contacting step) performed at 250° C. and 30 bar. CO₂ capture and the associated product yield and C-selectivity during reactive desorption are illustrated in FIG. 12. CO₂ adsorption was significantly lower when utilizing 1-Na/CZA solids and 10-Na/CZA solids, at 108 μmol/g and 80 μmol/g vs 150 μmol/g for 5-Na/CZA solids, a respective 29% and 47% decrease. This lower CO₂ capture correlated to lower overall yield. Product selectivity to MeOH was nearly identical for 5-Na/CZA solids and 10-Na/CZA solids (57 and 58%, respectively), but decrease to 44% for 1-Na/CZA solids.

Parametric study with varying reactive desorption conditions: A parametric study of reactive conversion conditions was explored, using a CO₂ contacting/capture temperature of 100° C. and 5-cycles per condition. To also incorporate a study of Na loadings, a design of experiments (DoE) matrix was developed to ensure randomized tests with statistically relevant information, with special emphasis in maximizing MeOH yield. For these experiments the variables to study and their low, middle, and high points chosen for the DoE matrix are as follow:

Na loadings of 5 and 10 wt % of Na (as Na₂O) on CZA solids;

Reactive desorption temperatures of 200, 225 and 250° C.

Hydrogen pressures of 10, 20 and 30 bar;

Hydrogen concentrations of 10, 55 and 100%

The DoE matrix included randomized test sequence for each Na loading in one set. An 18-experiment, full factorial matrix, selecting the low, middle, and high Na-loading points, but only selecting the low and high points for the T, P and H₂ concentration variables was performed. The results are illustrated in FIG. 13 for the two Na/CZA DFMs (see Table 5).

TABLE 5

Design of experiments (DoE) matrix for 10-Na/CZA solids with varying conversion step conditions (T, P and H₂ concentration)

| DoE point | Conversion P (bar) | Conversion T (° C.) | H₂ conc. (%) |
|---|---|---|---|
| 1 | 30 | 250 | 10 |
| 2 | 10 | 200 | 100 |
| 3 | 30 | 250 | 100 |
| 4 | 10 | 250 | 100 |
| 5 | 10 | 200 | 10 |
| 6 | 30 | 200 | 100 |

At low H₂ concentration (10%), CO was produced with 100% selectivity, and this condition also had the greatest amount of unreacted CO₂ desorbed (DOE-1). MeOH was produced at 75% selectivity with high $H_2$ concentration (100%), even at a relatively low pressure of 10 bar and low temperature of 200° C. (DOE-2). At low pressure (10 bar) and high temperature (250° C.), CO production was favored (73% selectivity, DOE-4). At low pressure, low temperature, and low $H_2$ concentration, the overall product yield was the lowest observed due to high desorption of unreacted $CO_2$ and increased selectivity towards CO and $CH_4$ (DOE-5). Finally, the highest selectivity towards MeOH (97.6%) was observed at a high pressure of 30 bar, low hydrogenation temperature of 200° C., and high $H_2$ concentration (100%) (DOE-6).

The DoE conditions tested on 5-Na/CZA solids assesses the reproducibility of the DoE approach with multiple points having the same conditions: DOE-1 and 3 are identical to DOE-6 and 4, respectively. The results are presented in FIG. 14 with the detailed DoE matrix information outlined in Table 6. MeOH was produced only in DOE-2 and DOE-5, where the $H_2$ concentration was high (100%). The selectivity towards MeOH was similar in the two cases (53.0% for DOE-2 vs. 52.8% for DOE-5), but the yield was greater in DOE-5 (44.71 μmol/g) where the conversion temperature and pressure were higher (30 bar, 250° C.). A similar matrix of conditions was performed for 1-Na/CZA (Table 7). The results are illustrated in FIG. 15. The highest selectivity towards MeOH (73.6%) was observed at a high pressure of 30 bar, low conversion temperature of 200° C., and high $H_2$ concentration (100%) (DOE-1).

TABLE 6

Design of experiments (DoE) matrix for 5-Na/CZA solids with varying conversion conditions (T, P and $H_2$ concentration)

| DoE point | Conversion P (bar) | Conversion T (° C.) | $H_2$ conc. (%) |
|---|---|---|---|
| 1 | 30 | 200 | 10 |
| 2 | 10 | 200 | 100 |
| 3 | 10 | 250 | 10 |
| 4 | 10 | 250 | 10 |
| 5 | 30 | 250 | 100 |
| 6 | 30 | 200 | 10 |

TABLE 7

Design of experiments (DoE) matrix for 1-Na/CZA solids with varying conversion conditions (T, P and $H_2$ concentration)

| DoE point | Conversion P (bar) | Conversion T (° C.) | $H_2$ conc. (%) |
|---|---|---|---|
| 1 | 30 | 200 | 100 |
| 2 | 10 | 250 | 100 |
| 3 | 10 | 200 | 100 |
| 4 | 10 | 200 | 10 |
| 5 | 30 | 250 | 10 |
| 6 | 30 | 250 | 100 |

The data from the DoE on 1-, 5-, and 10-Na/CZA indicate that high pressure, low conversion temperature, and high $H_2$ concentration result in greater MeOH yield and selectivity. FIG. 16 illustrates the side-by-side comparison of the performance at the different Na loadings and the optimal conversion conditions of 30 bar, 200° C. and 100% $H_2$. MeOH yield was 53.2 μmol/g, 43.9 μmol/g and 46.1 μmol/g for 1-, 5-, and 10-Na/CZA, respectively. It is important to mention that for 1-Na/CZA solids, these set of conversion conditions corresponded to DOE-1, early in the cyclic testing protocol. On the other hand, for 5-Na/CZA solids and 10-Na/CZA solids, these conditions were tested late in the protocol (after DOE-6 and at DOE-6, respectively). Therefore, the slightly higher MeOH yield of 1-Na/CZA solids may be due to a more catalytically active solid at the beginning of the DoE matrix, while the MeOH yield for 5- and 10-Na/CZA solid may be more representative of an aged material. MeOH selectivity was 73.6%, 86.5% and 97.6% for 1-, 5-, and 10-Na/CZA solids, respectively, indicating a trend of higher MeOH selectivity with higher Na loadings at these conversion conditions. Finally, these data indicate that very high methanol selectivity can be achieved over 10-Na/CZA solid.

Effect of $O_2$ during $CO_2$ capture step on $CO_2$ capture/conversion performance of Na/CZA solids: $CO_2$ capture/conversion performance using 5-Na/CZA solids was evaluated without (1% $CO_2$, 99% $N_2$) and with the presence of $O_2$ (1% $CO_2$, 5% $O_2$, 94% $N_2$) during the $CO_2$ capture step at temperatures of 50° C. and 100° C. The conversion step was performed at 250° C. and 30 bar. Five $CO_2$ capture/conversion cycles were performed at each condition with the average of the last 3 cycles illustrated in FIG. 17. The observed products were CO, MeOH and $CH_4$. At both contact conditions, the MeOH yield increased with co-fed $O_2$ in the capture step, increasing from 34 to 57 μmol/g for $T_{ads}$ of 50° C. and from 43 to 65 μmol/g for $T_{ads}$ of 100° C. In all cases, MeOH selectivity was ca. 50% (see Panel B of FIG. 17). Importantly, $CH_4$ production was negligible at all conditions (selectivity≤0.92%). This data demonstrates the stability of the CZA based solids in $O_2$-containing $CO_2$ streams, such as flue gas or direct air capture, in terms of the MeOH yield and selectivity.

Performance of ZA solids and base-modified ZA solids in reactive carbon capture cycles: Performance of ZA and Ca/ZA solids were evaluated in isothermal reactive carbon capture cycles at varying reactive desorption pressures. In these cycles, $CO_2$ capture, purge and conversion steps were performed at the same temperature (325° C.). However, the conversion pressure was varied from atmospheric pressure to 30 bar, while other steps were performed at atmospheric pressure. The details on process conditions can be found in Table 8B, and the chemisorbed $CO_2$, unreacted $CO_2$ desorbed and hydrogenated products evolved during the conversion step are reported in FIG. 18 and Table 8A. CO and $CH_4$ were the main products evolved during the conversion step, with only traces of MeOH detected for Ca/ZA solids, mostly in cycle #1. In accordance with the previous chemisorption isotherms results, the $CO_2$ capture capacity for Ca/ZA solids increased 4-5 times as compared to unmodified ZA solids. For the ZA-based solids, CO was the main product, especially at atm pressure for both ZA solids and Ca/ZA solids. At P≥10 bar, $CH_4$ is also formed on both solids. Traces of MeOH only formed at P=30 bar.

TABLE 8A $CO_2$ capture during the first contacting step, C-balance and product yield (mmol/$g_{DFM}$) of all products, including desorbed $CO_2$ during the reactive conversion step over ZA, K/ZA, and Ca/ZA solids during reactive carbon capture operations. Details on process conditions studied for the cycles are summarized in Table 8B.

| | Cycle | 1 | 2 | 3 | 4 |
|---|---|---|---|---|---|
| $CO_2$ total capture | ZA | 29.0 | 20.1 | 27.6 | 25.3 |
| (μmol/g) | Ca/ZA | 134.0 | 87.4 | 147.3 | 124.9 |
| CO yield (μmol/g) | ZA | 9.1 | 17.7 | 6.4 | 11.4 |
| | Ca/ZA | 62.5 | 137.2 | 81.8 | 110.2 |
| MeOH yield | ZA | 0.0 | 0.0 | 0.0 | 0.0 |
| (μmol/g) | Ca/ZA | 1.6 | 0.2 | 0.3 | 0.0 |

TABLE 8A-continued

CO$_2$ capture during the first contacting step, C-balance and product yield (mmol/g$_{DFM}$) of all products, including desorbed CO$_2$ during the reactive conversion step over ZA, K/ZA, and Ca/ZA solids during reactive carbon capture operations. Details on process conditions studied for the cycles are summarized in Table 8B.

|  |  | Cycle | 1 | 2 | 3 | 4 |
|---|---|---|---|---|---|---|
| CH$_4$ yield | ZA | | 3.7 | 0.0 | 2.0 | 2.4 |
| (μmol/g) | Ca/ZA | | 9.7 | 0.1 | 7.8 | 5.7 |
| CO$_2$ | ZA | | 0.0 | 0.0 | 2.0 | 8.3 |
| desorption | Ca/ZA | | 3.2 | 0.0 | 0.6 | 0.0 |
| (μmol/g) | | | | | | |
| C-Balance | ZA | | 44% | 88% | 38% | 88% |
| | Ca/ZA | | 57% | 157% | 61% | 93% |

TABLE 8B

Process Conditions for Data Illustrated in FIG. 18.

| Cycle # | Contact T [° C.] | H$_2$ purge | Conversion T [° C.] | Conversion P [bar] |
|---|---|---|---|---|
| 1 | 325 | no | 325 | 30 |
| 2 | 325 | no | 325 | 0.8 |
| 3 | 325 | no | 325 | 20 |
| 4 | 325 | no | 325 | 10 |

Performance of K/ZA solids were evaluated in isothermal reactive carbon capture cycles with a narrower range of conditions. In these cycles, CO$_2$ capture, purge and conversion were performed at a single lower temperature of 300° C.; all steps were also performed at atmospheric pressure. The chemisorbed CO$_2$, unreacted CO$_2$ desorbed, and hydrogenated products evolved during the conversion step are reported in Table 8C. The primary product evolved during every conversion step was CO. Minor quantities of CH$_4$ were observed in cycles 2-4. Capture of CO$_2$ was initially higher than observed in previous results for Ca/ZA, but decreased monotonically over the 4 cycles.

TABLE 8C

CO$_2$ capture during the first contacting step, C-balance and product yield (mmol/g$_{DFM}$) of all products, including desorbed CO$_2$ during the reactive conversion step over K/ZA during reactive carbon capture operations. Process conditions for each cycle (300° C., atmospheric pressure) were held constant.

|  |  | Cycle | 1 | 2 | 3 | 4 |
|---|---|---|---|---|---|---|
| CO$_2$ total capture (μmol/g) | K/ZA | | 157.6 | 140.5 | 125.3 | 104.0 |
| CO yield (μmol/g) | K/ZA | | 91.1 | 92.2 | 89.3 | 89.8 |
| MeOH yield (μmol/g) | K/ZA | | 0.2 | 0.1 | 0.2 | 0.2 |
| CH$_4$ yield (μmol/g) | K/ZA | | 0.3 | 4.2 | 6.1 | 5.4 |
| CO$_2$ desorption (μmol/g) | K/ZA | | 6.2 | 0.0 | 7.7 | 5.3 |
| C-Balance | K/ZA | | 62% | 70% | 83% | 97% |

Referring to FIG. 19, unmodified ZA and base-modified ZA solids were also tested in reactive carbon capture performance under temperature-swing conditions (i.e., changing temperature from that used during the CO$_2$ capture step to that used during the CO$_2$ conversion step). The solids used had varying Zn:Al ratios, termed here as zinc-rich (ZA-Z), equal ratio (ZA), and alumina-rich (ZA-A), having targeted Zn:Al wt % ratios of 2.4:1, 1:1, and 1:2.4, respectively.

Potassium modified solid compositions were also tested, termed accordingly as K/ZA-A, K/ZA, and K/ZA-Z. These RCC cycles included the following steps after a pretreatment under flowing H$_2$ at 400° C. for 8 hours and a purge with N$_2$ flowing at 100 sccm for 1 hour at 100° C. and atmospheric pressure:

1. CO$_2$ capture with 1% CO$_2$/N$_2$ flowing at 100 sccm for 1 hour at 100° C. and atmospheric pressure;
2. Reactor purging with N$_2$ flowing at 100 sccm for 1 hour at 100° C. and atmospheric pressure;
3. Conversion (reactive desorption) of CO$_2$ under H$_2$ flowing at 100 sccm, where the temperature is ramped from 100 to 400° C. and held for 2 hours;
4. Cool under N$_2$ flowing at 100 sccm to 100° C. and atmospheric pressure, held for 1 hour.

Three CO$_2$ capture/conversion cycles were measured to obtain average performance values. CO$_2$ capture generally increased as the ZA solid became more Zn-rich, with CO$_2$ capture values of 86.4, 110, and 33.3 μmol/g$_{DF}$M on ZA-Z, ZA, and ZA-A, respectively. ZA-A exhibited the poorest CO$_2$ capture, suggesting that the CO$_2$ capture site in these ZA solids are Zn-based. K-doping improved CO$_2$ capture to 330, 331, and 208 μmol/g$_{DFM}$ on K/ZA-Z, K/ZA, and K/ZA-A, respectively.

TABLE 9

CO$_2$ capture and conversion performance properties for undoped and K-doped ZA-Z, ZA, and ZA-A solid compositions. ± values are based on one standard deviation obtained from the average of three CO$_2$ capture/conversion cycles.

| Metric | ZA-Z | ZA | ZA-A | K/ZA-Z | K/ZA | K/ZA-A |
|---|---|---|---|---|---|---|
| CO$_2$ total capture (μmol/g$_{DFM}$) | 86.4 ± 5.11 | 110 ± 7.47 | 33.3 ± 6.67 | 330 ± 16.4 | 331 ± 41.1 | 208 ± 8.26 |
| CO$_2$ conversion (%) | 44.6 ± 2.70 | 40.8 ± 4.60 | 17.7 ± 3.30 | 55.5 ± 1.10 | 53.3 ± 0.5 | 33.2 ± 1.20 |
| CO yield (μmol/g$_{DFM}$) | 38.1 ± 2.28 | 44.9 ± 5.00 | 4.68 ± 1.83 | 165 ± 8.68 | 202 ± 3.70 | 68.0 ± 2.55 |
| CO$_2$ desorption (μmol/g$_{DFM}$) | 44.6 ± 2.29 | 72.6 ± 13.2 | 23.1 ± 7.81 | 132 ± 3.76 | 182 ± 6.51 | 145 ± 7.56 |

ZA-Z, ZA, and ZA-A solids exhibited CO$_2$ conversion values of 44.6, 40.8, and 17.7%, respectively. Trends in CO yield mirrored trends in CO$_2$ capture on the solids with ZA giving the highest CO yield at 44.9 μmol/g, followed by ZA-Z and ZA-A at 38.1 and 4.68 μmol/g, respectively. Despite a lower CO yield, the ZA-Z solid demonstrated a higher CO$_2$ conversion when compared to the ZA solid. CO was produced with high selectivity among all the ZA solids. ZA and ZA-Z solids produced CO with 99.2 and 99.6% selectivity, respectively. In contrast, the ZA-A solid produced CO with 77.2% selectivity, with 22.8% selectivity towards CH$_4$. The high product selectivity to CO suggests that reactive CO$_2$ capture using ZA materials is an appealing way to take emitted CO$_2$ from point-sources directly to a high purity syngas mixture. This process is particularly attractive in the context of replacing fossil-derived syngas in favor of syngas produced from waste and renewable carbon.

The improved CO$_2$ capture facilitated by K-doping solid compositions coincided with dramatic increases in CO yield on the K/ZA solids. The K/ZA solids demonstrated the highest CO yield of 202 μmol/g$_{DFM}$, followed by K/ZA-Z and K/ZA-A, with 165 and 68.0 μmol/g$_{DFM}$, respectively. CO$_2$ conversion increased from 44.6 to 55.5% on ZA-Z, 40.8 to 53.3% on ZA solids, and 17.7 to 33.2% on ZA-A solids after K-doping. This suggests that K sites are stabilizing $CO_2$ during the temperature ramp to temperatures where the solid composition begins to convert it to CO. The similar CO selectivity values across the unmodified and K-modified ZA solids suggests that K-sites do not alter overall reaction mechanisms that would lead to a change in selectivity.

K/ZA solid was selected as a representative material for reactive $CO_2$ capture testing under extended cycle numbers and $O_2$-containing streams, as it exhibited high $CO_2$ capture and conversion, over 95% selectivity to CO, and markedly higher CO yield when compared to K/ZA-Z solid ($1.22\times$ higher) and K/ZA-A solid ($2.97\times$ higher). The reactive $CO_2$ capture cycle procedure is summarized as follows:

15 cycles WITHOUT co-fed $O_2$: $100°$ C. $CO_2$ capture step in 1% $CO_2/N_2$, followed by a reactive desorption step in which the temperature was ramped to $400°$ C. under $H_2$. The first 5 cycles were used to achieve stabilized operation and is not reported here.

10 cycles WITH co-fed $O_2$: a $100°$ C. $CO_2$ capture step in 1% $CO_2$, 5% $O_2/N_2$, followed by a reactive desorption step in which the temperature was ramped to $400°$ C. under $H_2$.

FIG. 20 and Table 10 summarize the $CO_2$ capture, product yield, and $CO_2$ conversion for the last 20 reactive $CO_2$ capture/conversion cycles without and with co-fed $O_2$. The first five cycles without $O_2$ co-fed were used to achieve stable carbon capture/conversion operation and data were not analyzed. FIG. 20, along with Table 10, also include the average performance data for the cycles without and with co-fed $O_2$ for ease of comparison. The average $CO_2$ capture values were similar between the cycles without and with co-fed $O_2$ (332 to 325 $\mu mol/g_{DFM}$, respectively) with the difference within the error of the measurements. The CO selectivity remained higher than 99% and the $CO_2$ conversion remained close to 50% throughout all 20 cycles. These data indicate two key takeaways. First, the K/ZA solid is relatively stable during extended cycling. Second, the solid is highly tolerant to the presence of $O_2$ co-fed in the $CO_2$ stream, which is an important factor if using flue gas or direct air capture $CO_2$ sources.

Conceptual process design for RCC technology: A flow diagram for a reactive carbon capture process using solids design to capture and convert $CO_2$ is depicted in FIG. 21. Multiple reactors (four depicted in FIG. 21) are operating in parallel in 2 modes. Reactors 1 and 2 are in capture mode, where the solids in the reactors are capturing $CO_2$ from the inlet gas (e.g., gas-fired power plant flue gas). Reactors 3 and 4 are in conversion mode, where the gas delivery to the $CO_2$-saturated solids has been switched to $H_2$, and the chemisorbed $CO_2$ on the surfaces of the solids are reacting under $H_2$ flow at desired temperature and pressure to release products (including CO, methanol, $CH_4$, $H_2O$, unreacted $CO_2$ and $H_2$). This conversion step regenerates the solids for the next capture cycle. The operation modes of these reactors may be switched when the solids (in reactor 1 or 2) are saturated with $CO_2$ after the capture mode, and the solids (in reactor 3 or 4) are regenerated after the conversion step. Temperature, pressure, and cycle time in each stage may be controlled to optimize the capture and conversion activities of the solids (e.g., a T-and-P-swing process).

Another example of a reactive carbon capture process (see FIG. 22) includes adding a separation unit after the reactors to remove MeOH and water products and enable recycle of the remaining light gases, including CO, $CH_4$, unreacted $CO_2$ and $H_2$. The gas mixture is recycled to the reactor(s) operating in the conversion mode to reduce $H_2$ usage of the process, and further convert the intermediate CO and unreacted $CO_2$ to improve overall integrated MeOH yield in the process compared to a single-pass process.

A third example of a reactive carbon capture process (see FIG. 23) includes generating CO as the primary product from the $CO_2$ conversion and adding a downstream methanol synthesis reactor after the carbon capture/conversion reactors to convert CO and $H_2$ to methanol using a commercial methanol synthesis process. Products after a methanol synthesis reactor may be separated to recover methanol and water, with unreacted CO, $CO_2$ and other light gases ($CH_4$ and $H_2$) recycled to the reactive carbon capture reactors while operating in the conversion mode. Again, a reason for recycling the light gases is to reduce $H_2$ usage compared

TABLE 10

Summary of $CO_2$ capture, product yield, desorbed $CO_2$ and $CO_2$ conversion for the 20 cycles of reactive $CO_2$ capture/conversion testing performed on K/ZA. The average performance data for the cycles without and with co-fed $O_2$, along with standard deviations has also been included.

| Cycle number | $CO_2$ adsorption ($\mu mol/g_{DFM}$) | CO ($\mu mol/g_{DFM}$) | MeOH ($\mu mol/g_{DFM}$) | $CH_4$ ($\mu mol/g_{DFM}$) | DME ($\mu mol/g_{DEM}$) | $CO_2$ desorbed ($\mu mol/g_{DFM}$) | $CO_2$ conv. (%) |
|---|---|---|---|---|---|---|---|
| 1 (no $O_2$) | 341 | 173 | 0 | 0 | 0 | 147 | 51 |
| 2 (no $O_2$) | 342 | 169 | 0 | 0 | 0 | 168 | 50 |
| 7 (no $O_2$) | 340 | 164 | 0 | 0.08 | 0 | 162 | 48 |
| 8 (no $O_2$) | 330 | 162 | 0 | 0.76 | 0 | 163 | 49 |
| 9 (no $O_2$) | 316 | 162 | 0 | 0.43 | 0 | 156 | 51 |
| 10 (no $O_2$) | 325 | 164 | 0 | 0 | 0 | 164 | 51 |
| AVG (no $O_2$) | 332 ± 10 | 166 ± 4 | 0 | 0.21 ± 0.32 | 0 | 160 ± 8 | 50 ± 1 |
| 11 (co-fed $O_2$) | 318 | 166 | 0.34 | 0 | 0.08 | 150 | 52 |
| 12 (co-fed $O_2$) | 325 | 168 | 0 | 0 | 0 | 157 | 52 |
| 13 (co-fed $O_2$) | 338 | 162 | 0 | 1.1 | 0.01 | 162 | 48 |
| 14 (co-fed $O_2$) | 330 | 165 | 0 | 1.3 | 0 | 162 | 50 |
| 19 (co-fed $O_2$) | 315 | 156 | 0.08 | 0.35 | 0.04 | 165 | 50 |
| 20 (co-fed $O_2$) | 324 | 159 | 0 | 1.8 | 0.02 | 164 | 50 |
| AVG (co-fed $O_2$) | 325 ± 8 | 163 ± 4 | 0.07 ± 0.14 | 0.75 ± 0.74 | 0.02 ± 0.03 | 160 ± 6 | 50 ± 1 | to a single-pass reactive carbon capture process, and to increase the overall integrated MeOH yield.

ZA Composition Examples:

Example 1. A composition comprising: a first oxide comprising zinc and aluminum; a metal comprising at least one of an alkali metal or an alkaline earth metal; a first total uptake capacity of $CO_2$ of greater than 228 $\mu$mol $CO_2$/g of composition at a first temperature of about 40° C., and a second total uptake capacity of $CO_2$ of greater than 106 $\mu$mol $CO_2$/g of composition at a second temperature of about 300° C., wherein: the composition is capable of converting $CO_2$ to at least one of CO, methane, or methanol, when exposed to $H_2$ at a third temperature greater than the first temperature.

Example 2. The composition of Example 1, wherein the first uptake capacity is between 228 $\mu$mol $CO_2$/g of composition and 398 $\mu$mol $CO_2$/g of composition.

Example 3. The composition of either Example 1 or Example 2, wherein the second uptake capacity is between 106 $\mu$mol $CO_2$/g of composition and 250 $\mu$mol $CO_2$/g of composition.

Example 4. The composition of any one of Examples 1-3, wherein the zinc and the aluminum are present at a ratio of Zn:Al between 2:4:1 and 1:2.4 on a weight basis.

Example 5. The composition of any one of Examples 1-4, wherein the first oxide comprises ZnO and $ZnAl_2O_4$.

Example 6. The composition of any one of Examples 1-5, wherein at least a portion of the first oxide is in a crystalline phase.

Example 7. The composition of any one of Examples 1-6, wherein the crystalline phase comprises a spinel phase.

Example 8. The composition of any one of Examples 1-7, wherein the metal comprises at least one of magnesium, calcium, barium, strontium, lithium, sodium, potassium, rubidium, or cesium.

Example 9. The composition of any one of Examples 1-8, wherein the metal comprises potassium at a concentration between greater than 0 wt % and less than or equal to 20 wt % or between greater than 0 wt % and less than or equal to 10 wt %.

Example 10. The composition of any one of Examples 1-9, wherein the metal comprises calcium at a concentration between greater than 0 wt % and less than or equal to 20 wt % or between greater than 0 wt % and less than or equal to 10 wt %.

Example 11. The composition of any one of Examples 1-10, wherein the metal is in the form of at least one of a second oxide or a cation.

Example 12. The composition of any one of Examples 1-11, wherein the second oxide or cation comprises at least one of $Ca^{2+}$, CaO, $Ca(OH)_2$, $K^+$, KOH, or $K_2O$.

Example 13. The composition of any one of Examples 1-12, wherein the second oxide comprises at least one of amorphous CaO or amorphous $Ca(OH)_2$.

Example 14. The composition of any one of Examples 1-13, wherein the second oxide comprises at least one of amorphous KOH or amorphous $K_2O$.

Example 15. The composition of any one of Examples 1-14, wherein the second oxide is dispersed on the surface of the first oxide.

Example 16. The composition of any one of Examples 1-15, wherein the zinc and aluminum are present at a molar ratio of Zn:Al of about 1:1, the metal comprises potassium at a concentration between 5 wt % and 10 wt %, and the potassium is present as $K_2O$ dispersed on the first oxide.

CZA Composition Examples:

Example 1. A composition comprising: a first oxide comprising zinc, aluminum, and copper; a metal comprising least one of an alkali metal or an alkaline earth metal; a first total uptake capacity of $CO_2$ of greater than 218 $\mu$mol $CO_2$/g of composition at a first temperature of about 40° C., and a second total uptake capacity of $CO_2$ of greater than 76 $\mu$mol $CO_2$/g of composition at a second temperature of about 300° C., wherein: the composition is capable of converting $CO_2$ to at least one of CO, methane, or methanol, when exposed to $H_2$ at a third temperature greater than the first temperature.

Example 2. The composition of Example 1, wherein the first uptake capacity is between 218 $\mu$mol $CO_2$/g of composition and 300 $\mu$mol $CO_2$/g of composition.

Example 3. The composition of either Example 1 or Example 2, wherein the second uptake capacity is between 76 $\mu$mol $CO_2$/g of composition and 250 $\mu$mol $CO_2$/g of composition.

Example 4. The composition of any one of Examples 1-3, wherein the first oxide comprises CuO, ZnO, and $Al_2O_3$.

Example 5. The composition of any one of Examples 1-4, wherein at least a portion of the first oxide is in a crystalline phase.

Example 6. The composition of any one of Examples 1-5, wherein the metal comprises at least one of magnesium, calcium, barium, strontium, lithium, sodium, potassium, rubidium, or cesium.

Example 7. The composition of any one of Examples 1-6, wherein the metal is in the form of at least one of a second oxide or a cation.

Example 8. The composition of any one of Examples 1-7, wherein the second oxide is present at a concentration between 1 wt % and 10 wt %, inclusively.

Example 9. The composition of any one of Examples 1-8, wherein the second oxide or cation comprises at least one of $Ca^{2+}$, CaO, $Ca(OH)_2$, $Na^+$, NaOH, $Na_2O$, $K^+$, KOH, or $K_2O$.

Example 10. The composition of any one of Examples 1-9, wherein the second oxide is amorphous and comprises at least one of CaO, $Ca(OH)_2$, NaOH, $Na_2O$, KOH, or $K_2O$.

Example 11. The composition of any one of Examples 1-10, wherein the second oxide is dispersed on the surface of the first oxide.

Example 12. The composition of any one of Examples 1-11, wherein the metal comprises sodium at a concentration between 5 wt % and 10 wt % present as $Na_2O$ dispersed on the first oxide.

Method Example

Example 1. A method for reducing $CO_2$, utilizing any of the compositions of the examples above, the method comprising: a first contacting of the composition with $CO_2$ at a first temperature and a first pressure, resulting in chemisorption of the $CO_2$ onto the composition; and a second contacting of the composition with $H_2$ at a second temperature and a second pressure, resulting in a portion of the chemisorbed $CO_2$ reacting to form at least one of CO, methane, or methanol, wherein: the first temperature is between 0° C. and 450° C., the first pressure is between 0.8 bar and 30 bar (absolute), the second temperature is between 50° C. and 450° C., and the second pressure is between 0.8 bar and 30 bar (absolute).

Example 2. The method of Example 1, wherein the composition is positioned within at least one packed bed reactor.

Example 3. The method of either Example 1 or Example 2, wherein the first contacting is completed by providing the $CO_2$ in a continuous flow to the packed bed reactor.

Example 4. The method of any one of Examples 1-3, wherein the $CO_2$ is provided to the packed bed reactor in a gas stream at a molar concentration between 0.2 mol % and 100 mol % $CO_2$.

Example 5. The method of any one of Examples 1-4, wherein the second contacting is completed by providing the $H_2$ in a continuous flow to the packed bed reactor.

Example 6. The method of any one of Examples 1-5, wherein the $H_2$ and chemisorbed $CO_2$ are provided at a molar ratio of $H_2:CO_2$ between 1:1 and 10:1.

Example 7. The method of any one of Examples 1-6, further comprising [FIG. 22]: a separating, wherein: during the second contacting, a first stream comprising $H_2$, $CO_2$, and methanol and at least one of CO or methane exit the packed bed reactor, the first stream is directed to the separating, which separates the first stream into a second stream comprising methanol and a third stream comprising $H_2$, $CO_2$, and at least one of CO or methane, and the third stream is recycled to the second contacting.

Example 8. The method of any one of Examples 1-7, further comprising [FIG. 23]: a reacting; and a separating, wherein: during the second contacting, a first stream comprising $H_2$ and $CO_2$, and at least one of CO or methane exit the packed bed reactor, the first stream is directed to the reacting resulting in at least a portion of the $H_2$ and $CO_2$, and at least one of the CO or methane reacting to form a second stream comprising methanol, the second stream is directed to the separating, which separates the second stream into a third stream comprising methanol and a fourth stream comprising $H_2$, $CO_2$, and at least one of CO or methane, and the fourth stream is recycled to the second contacting.

Example 9. A method for reducing $CO_2$, utilizing an Na/CZA composition, the method comprising: a first contacting of the composition with $CO_2$ at a temperature between 50° C. and 100° C. and a first pressure less than or equal to 2 bar, resulting in chemisorption of the $CO_2$ onto the composition; and a second contacting of the composition with $H_2$ at a second temperature between 200° C. and 225° C. and a second pressure between 10 bar and 30 bar (absolute), resulting in a portion of the chemisorbed $CO_2$ reacting to form at least one of CO, methane, or methanol.

Example 10. The method of any one of Example 9 [Na/CZA], further comprising [FIG. 22]: a separating, wherein: during the second contacting, a first stream comprising $H_2$, $CO_2$, and methanol and at least one of CO or methane exit the packed bed reactor, the first stream is directed to the separating, which separates the first stream into a second stream comprising methanol and a third stream comprising $H_2$, $CO_2$, and at least one of CO or methane, and the third stream is recycled to the second contacting.

Example 11. A method for reducing $CO_2$ under isothermal and isobaric conditions, utilizing a K/ZA composition [K/ZA], the method comprising: a first contacting of the composition with $CO_2$ at a temperature between 300° C. and 350° C. and a first pressure less than or equal to 2 bar, resulting in chemisorption of the $CO_2$ onto the composition; and a second contacting of the composition with $H_2$ at the same temperature between 300° C. and 350° C. and a second pressure less than or equal to 2 bar, resulting in a portion of the chemisorbed $CO_2$ reacting to form at least one of CO, methane, or methanol.

Example 12. A method for reducing $CO_2$, utilizing a K/ZA composition, the method comprising: a first contacting of the composition with $CO_2$ at a temperature between 50° C. and 150° C. and a first pressure less than or equal to 2 bar, resulting in chemisorption of the $CO_2$ onto the composition; and a second contacting of the composition with $H_2$ at a second temperature between 300° C. and 450° C. and a second pressure between 1 bar and 30 bar (absolute), resulting in a portion of the chemisorbed $CO_2$ reacting to form at least one of CO, methane, or methanol.

Example 13. The method of either Example 11 or Example 12, further comprising [FIG. 23]: a reacting; and a separating, wherein: during the second contacting, a first stream comprising $H_2$ and $CO_2$, and at least one of CO or methane exit the packed bed reactor, the first stream is directed to the reacting resulting in at least a portion of the $H_2$ and $CO_2$, and at least one of the CO or methane reacting to form a second stream comprising methanol, the second stream is directed to the separating, which separates the second stream into a third stream comprising methanol and a fourth stream comprising $H_2$, $CO_2$, and at least one of CO or methane, and the fourth stream is recycled to the second contacting.

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, 5%, or ±1% of a specific numeric value or target. In some embodiments of the present invention, the term "about" is used to indicate an uncertainty limit of less than or equal to ±1%, 0.9%, 0.8%, ±0.7%, 0.6%, 0.5%, ±0.4%, ±0.3%, ±0.2%, or ±0.1% of a specific numeric value or target.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A composition comprising:
an oxide comprising zinc, aluminum, and copper; and
sodium at a concentration between 5 wt % and 10 wt % present as $Na_2O$ dispersed on the oxide, wherein:
the composition is capable of reversibly capturing $CO_2$.

2. The composition of claim 1, wherein the oxide comprises CuO, ZnO, and $Al_2O_3$.

3. The composition of claim 2, wherein at least a portion of the oxide is in a crystalline phase.

4. The composition of claim 1, wherein the $Na_2O$ is amorphous.

5. A method for reducing $CO_2$, utilizing a solid composition, the method comprising:
a first contacting of the solid composition with $CO_2$ at a first temperature and a first pressure, resulting in chemisorption of the $CO_2$ onto the composition; and
a second contacting of the solid composition with $H_2$ at a second temperature and a second pressure, resulting in a portion of the chemisorbed $CO_2$ reacting to form at least one of CO, methane, or methanol, wherein:
the solid composition comprises:
an oxide comprising zinc, aluminum, and copper; and
sodium at a concentration between 5 wt % and 10 wt % present as $Na_2O$ dispersed on the oxide;
the first temperature is between 0° C. and 450° C.,
the first pressure is between 0.8 bar and 30 bar (absolute),
the second temperature is between 50° C. and 450° C., and
the second pressure is between 0.8 bar and 30 bar (absolute).

6. The composition of claim 1, further comprising:
a first total uptake capacity of $CO_2$ of greater than 218 μmol $CO_2$/g of composition at a first temperature of about 40° C., and
a second total uptake capacity of $CO_2$ of greater than 76 μmol $CO_2$/g of composition at a second temperature of about 300° C., wherein:
the composition is capable of converting $CO_2$ to at least one of CO, methane, or methanol, when exposed to $H_2$ at a third temperature greater than the first temperature.

7. The composition of claim 6, wherein the first total uptake capacity is between 218 μmol $CO_2$/g of composition and 300 μmol $CO_2$/g of composition.

8. The composition of claim 6, wherein the second total uptake capacity is between 76 μmol $CO_2$/g of composition and 250 μmol $CO_2$/g of composition.

9. The method of claim 5, wherein the solid composition is positioned within at least one packed bed reactor.

10. The method of claim 9, wherein the first contacting is completed by providing the $CO_2$ in a continuous flow to the packed bed reactor.

11. The method of claim 9, wherein the $CO_2$ is provided to the packed bed reactor in a gas stream at a molar concentration between 0.2 mol % and 100 mol % $CO_2$.

12. The method of claim 9, wherein the second contacting is completed by providing the $H_2$ in a continuous flow to the packed bed reactor.

13. The method of claim 9, wherein the $H_2$ and chemisorbed $CO_2$ are provided at a molar ratio of $H_2$:$CO_2$ between 1:1 and 10:1.

14. The method of claim 9, further comprising:
a separating, wherein:
during the second contacting, a first stream comprising $H_2$, $CO_2$, and methanol and at least one of CO or methane exit the packed bed reactor,
the first stream is directed to the separating, which separates the first stream into a second stream comprising methanol and a third stream comprising $H_2$ and $CO_2$, and
at least one of CO or methane, and the third stream is recycled to the second contacting.

15. The method of claim 9, further comprising:
a reacting; and
a separating, wherein:
during the second contacting, a first stream comprising $H_2$ and $CO_2$, and at least one of CO or methane exit the packed bed reactor,
the first stream is directed to the reacting resulting in at least a portion of the $H_2$ and $CO_2$, and at least one of the CO or methane reacting to form a second stream comprising methanol,
the second stream is directed to the separating, which separates the second stream into a third stream comprising methanol and a fourth stream comprising $H_2$ and $CO_2$, and at least one of CO or methane, and the fourth stream is recycled to the second contacting.

* * * * *